United States Patent
Hammack et al.

(10) Patent No.: US 8,825,183 B2
(45) Date of Patent: Sep. 2, 2014

(54) METHODS FOR A DATA DRIVEN INTERFACE BASED ON RELATIONSHIPS BETWEEN PROCESS CONTROL TAGS

(75) Inventors: Stephen Gerard Hammack, Austin, TX (US); Bruce Hurbert Campney, Pflugerville, TX (US); Ling Zhou, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 720 days.

(21) Appl. No.: 12/728,922

(22) Filed: Mar. 22, 2010

(65) Prior Publication Data

US 2011/0230980 A1 Sep. 22, 2011

(51) Int. Cl.
*G06F 3/048* (2013.01)

(52) U.S. Cl.
USPC ............................................ 700/17; 715/771

(58) Field of Classification Search
CPC ............ G05B 2219/32154; G05B 2219/32155
USPC ...................................................... 700/17, 83
See application file for complete search history.

(56) References Cited

U.S. PATENT DOCUMENTS

| | | | |
|---|---|---|---|
| RE30,280 E | 5/1980 | Berman et al. | |
| 4,244,385 A | 1/1981 | Hotine | |
| 4,506,324 A | 3/1985 | Healy | |
| 4,512,747 A | 4/1985 | Hitchens et al. | |
| 4,628,435 A | 12/1986 | Tashiro et al. | |
| 4,663,704 A | 5/1987 | Jones et al. | |
| 4,736,320 A | 4/1988 | Bristol | |
| 4,843,538 A | 6/1989 | Lane et al. | |
| 4,885,717 A | 12/1989 | Beck et al. | |
| 4,972,328 A | 11/1990 | Wu et al. | |
| 4,977,529 A | 12/1990 | Gregg et al. | |
| 4,985,857 A | 1/1991 | Bajpai et al. | |
| 5,014,208 A | 5/1991 | Wolfson | |
| 5,021,947 A | 6/1991 | Campbell et al. | |
| 5,041,964 A | 8/1991 | Cole et al. | |
| 5,051,898 A | 9/1991 | Wright et al. | |

(Continued)

FOREIGN PATENT DOCUMENTS

| | | |
|---|---|---|
| CN | 1130430 A | 9/1996 |
| EP | 0 482 523 A2 | 4/1992 |

(Continued)

OTHER PUBLICATIONS

Search Report for Application No. GB1103056.6, dated Jun. 23, 2011.

(Continued)

*Primary Examiner* — Ryan Jarrett
(74) *Attorney, Agent, or Firm* — Marshall, Gerstein & Borun LLP

(57) ABSTRACT

Navigation between process control graphics representative of process control entities in an operator display includes a list of relationship value references and process control graphical element identifications associated with each relationship value reference. Each process control graphical element identification uniquely identifies a process control graphical element of the operator display, each relationship is between various physical/logical entities and each relationship value reference uniquely identifies a logical and/or physical relationship between two or more entities within the process plant. One or more relationships are associated with a graphical object. Each relationship value reference is bound to two or more process control graphical elements of the operator display based on associated process control graphical element identifications.

14 Claims, 8 Drawing Sheets

(56) References Cited

U.S. PATENT DOCUMENTS

| | | |
|---|---|---|
| 5,079,731 A | 1/1992 | Miller et al. |
| 5,092,449 A | 3/1992 | Bolin et al. |
| 5,097,412 A | 3/1992 | Orimo et al. |
| 5,119,468 A | 6/1992 | Owens |
| 5,168,441 A | 12/1992 | Onarheim et al. |
| 5,218,709 A | 6/1993 | Fijany et al. |
| 5,268,834 A | 12/1993 | Sanner et al. |
| 5,321,829 A | 6/1994 | Zifferer |
| 5,347,446 A | 9/1994 | Iino et al. |
| 5,347,466 A | 9/1994 | Nichols et al. |
| 5,361,198 A | 11/1994 | Harmon et al. |
| 5,408,412 A | 4/1995 | Hogg et al. |
| 5,408,603 A | 4/1995 | Van de Lavoir et al. |
| 5,421,017 A | 5/1995 | Scholz et al. |
| 5,428,555 A | 6/1995 | Starkey et al. |
| 5,485,600 A | 1/1996 | Joseph et al. |
| 5,485,620 A | 1/1996 | Sadre et al. |
| 5,499,333 A | 3/1996 | Doudnikoff et al. |
| 5,509,116 A | 4/1996 | Hiraga et al. |
| 5,530,643 A | 6/1996 | Hodorowski |
| 5,546,301 A | 8/1996 | Agrawal et al. |
| 5,555,385 A | 9/1996 | Osisek |
| 5,576,946 A | 11/1996 | Bender et al. |
| 5,594,858 A | 1/1997 | Blevins |
| 5,603,018 A | 2/1997 | Terada et al. |
| 5,611,059 A | 3/1997 | Benton et al. |
| 5,631,825 A | 5/1997 | van Weele et al. |
| 5,675,756 A | 10/1997 | Benton et al. |
| 5,680,409 A | 10/1997 | Qin et al. |
| 5,706,455 A | 1/1998 | Benton et al. |
| 5,752,008 A | 5/1998 | Bowling |
| 5,768,119 A | 6/1998 | Havekost et al. |
| 5,782,330 A | 7/1998 | Mehlert et al. |
| 5,796,602 A | 8/1998 | Wellan et al. |
| 5,801,942 A | 9/1998 | Nixon et al. |
| 5,806,053 A | 9/1998 | Tresp et al. |
| 5,812,394 A | 9/1998 | Lewis et al. |
| 5,818,736 A | 10/1998 | Leibold |
| 5,821,934 A | 10/1998 | Kodosky et al. |
| 5,826,060 A | 10/1998 | Santoline et al. |
| 5,828,851 A | 10/1998 | Nixon et al. |
| 5,838,563 A | 11/1998 | Dove et al. |
| 5,841,654 A | 11/1998 | Verissimo et al. |
| 5,862,052 A | 1/1999 | Nixon et al. |
| 5,892,939 A | 4/1999 | Call et al. |
| 5,898,860 A | 4/1999 | Leibold |
| 5,903,455 A | 5/1999 | Sharpe, Jr. et al. |
| 5,909,368 A | 6/1999 | Nixon et al. |
| 5,909,916 A | 6/1999 | Foster et al. |
| 5,926,177 A | 7/1999 | Hatanaka et al. |
| 5,929,855 A | 7/1999 | Benton et al. |
| 5,940,294 A | 8/1999 | Dove |
| 5,950,006 A | 9/1999 | Crater et al. |
| 5,960,214 A | 9/1999 | Sharpe, Jr. et al. |
| 5,970,430 A | 10/1999 | Burns et al. |
| 5,980,078 A | 11/1999 | Krivoshein et al. |
| 5,995,753 A | 11/1999 | Walker |
| 5,995,916 A | 11/1999 | Nixon et al. |
| 6,003,037 A | 12/1999 | Kassabgi et al. |
| 6,023,644 A | 2/2000 | Kinsman |
| 6,028,998 A | 2/2000 | Gloudeman et al. |
| 6,032,208 A | 2/2000 | Nixon et al. |
| 6,041,171 A | 3/2000 | Blaisdell et al. |
| 6,078,320 A | 6/2000 | Dove et al. |
| 6,094,600 A | 7/2000 | Sharpe, Jr. et al. |
| 6,098,116 A | 8/2000 | Nixon et al. |
| 6,138,174 A | 10/2000 | Keeley |
| 6,146,143 A | 11/2000 | Huston et al. |
| 6,157,864 A | 12/2000 | Schwenke et al. |
| 6,161,051 A | 12/2000 | Hafemann et al. |
| 6,167,316 A | 12/2000 | Gloudeman et al. |
| 6,173,208 B1 | 1/2001 | Park et al. |
| 6,178,393 B1 | 1/2001 | Irvin |
| 6,192,390 B1 | 2/2001 | Berger et al. |
| 6,195,591 B1 | 2/2001 | Nixon et al. |
| 6,201,996 B1 | 3/2001 | Crater et al. |
| 6,233,586 B1 | 5/2001 | Chang et al. |
| 6,298,454 B1 | 10/2001 | Schleiss et al. |
| 6,362,839 B1 | 3/2002 | Hamilton et al. |
| 6,366,272 B1 | 4/2002 | Rosenberg et al. |
| 6,369,841 B1 | 4/2002 | Salomon et al. |
| 6,385,496 B1 | 5/2002 | Irwin et al. |
| 6,396,516 B1 | 5/2002 | Beatty |
| 6,415,418 B1 | 7/2002 | McLaughlin et al. |
| 6,421,571 B1 | 7/2002 | Spriggs et al. |
| 6,442,512 B1 | 8/2002 | Sengupta et al. |
| 6,442,515 B1 | 8/2002 | Varma et al. |
| 6,445,963 B1 | 9/2002 | Blevins et al. |
| 6,449,624 B1 | 9/2002 | Hammack et al. |
| 6,477,435 B1 | 11/2002 | Ryan et al. |
| 6,477,527 B2 | 11/2002 | Carey et al. |
| 6,480,860 B1 | 11/2002 | Monday |
| 6,510,351 B1 | 1/2003 | Blevins et al. |
| 6,515,683 B1 | 2/2003 | Wright |
| 6,522,934 B1 | 2/2003 | Irwin et al. |
| 6,546,297 B1 | 4/2003 | Gaston et al. |
| 6,571,133 B1 | 5/2003 | Mandl et al. |
| 6,577,908 B1 | 6/2003 | Wojsznis et al. |
| 6,587,108 B1 | 7/2003 | Guerlain et al. |
| 6,615,090 B1 | 9/2003 | Blevins et al. |
| 6,618,630 B1 | 9/2003 | Jundt et al. |
| 6,618,745 B2 | 9/2003 | Christensen et al. |
| 6,633,782 B1 | 10/2003 | Schleiss et al. |
| 6,646,545 B2 | 11/2003 | Bligh |
| 6,647,315 B1 | 11/2003 | Sherriff et al. |
| 6,668,257 B1 | 12/2003 | Greef et al. |
| 6,684,261 B1 | 1/2004 | Orton et al. |
| 6,684,385 B1 | 1/2004 | Bailey et al. |
| 6,687,698 B1 | 2/2004 | Nixon et al. |
| 6,691,280 B1 | 2/2004 | Dove et al. |
| 6,704,737 B1 | 3/2004 | Nixon et al. |
| 6,711,629 B1 | 3/2004 | Christensen et al. |
| 6,760,711 B1 | 7/2004 | Gillett et al. |
| 6,788,980 B1 | 9/2004 | Johnson |
| 6,795,798 B2 | 9/2004 | Eryurek et al. |
| 6,826,521 B1 | 11/2004 | Hess et al. |
| 6,854,111 B1 | 2/2005 | Havner et al. |
| 6,904,415 B2 | 6/2005 | Krahn et al. |
| 6,948,173 B1 | 9/2005 | Isom |
| 6,957,110 B2 | 10/2005 | Wewalaarachchi et al. |
| 6,973,508 B2 | 12/2005 | Shepard et al. |
| 6,980,869 B1 | 12/2005 | Chandhoke |
| 7,043,311 B2 | 5/2006 | Nixon et al. |
| 7,050,083 B2 | 5/2006 | Yoo et al. |
| 7,050,863 B2 | 5/2006 | Mehta et al. |
| 7,065,476 B2 | 6/2006 | Dessureault et al. |
| 7,086,009 B2 | 8/2006 | Resnick et al. |
| 7,110,835 B2 | 9/2006 | Blevins et al. |
| 7,113,834 B2 | 9/2006 | Wojsznis et al. |
| 7,117,052 B2 | 10/2006 | Lucas et al. |
| 7,146,231 B2 | 12/2006 | Schleiss et al. |
| 7,165,226 B2 | 1/2007 | Thurner et al. |
| 7,210,039 B2 | 4/2007 | Rodgers et al. |
| 7,234,138 B2 | 6/2007 | Crevatin |
| 7,308,473 B1 | 12/2007 | Thomas et al. |
| 7,320,005 B2 | 1/2008 | Li et al. |
| 7,330,768 B2 | 2/2008 | Scott et al. |
| 7,376,661 B2 | 5/2008 | Larson |
| 7,404,476 B2 | 7/2008 | Yoshida |
| 7,526,347 B2 | 4/2009 | Lucas et al. |
| 7,647,126 B2 | 1/2010 | Blevins et al. |
| 7,647,558 B2 | 1/2010 | Ucar et al. |
| 7,680,546 B2 | 3/2010 | Gilbert et al. |
| 7,702,409 B2 | 4/2010 | Lucas et al. |
| 7,711,959 B2 | 5/2010 | Schmidt et al. |
| 7,734,357 B2 | 6/2010 | Wolf |
| 2001/0007984 A1 | 7/2001 | Fattah et al. |
| 2001/0010053 A1 | 7/2001 | Ben-Shachar et al. |
| 2001/0051949 A1 | 12/2001 | Carey et al. |
| 2002/0004796 A1 | 1/2002 | Vange et al. |
| 2002/0010571 A1 | 1/2002 | Daniel et al. |
| 2002/0019672 A1 | 2/2002 | Paunonen |
| 2002/0022894 A1 | 2/2002 | Eryurek et al. |
| 2002/0022895 A1 | 2/2002 | Genise et al. |

(56) References Cited

U.S. PATENT DOCUMENTS

| | | |
|---|---|---|
| 2002/0046290 A1 | 4/2002 | Andersson et al. |
| 2002/0055790 A1 | 5/2002 | Havekost |
| 2002/0059282 A1 | 5/2002 | Andersson et al. |
| 2002/0077711 A1 | 6/2002 | Nixon et al. |
| 2002/0123864 A1 | 9/2002 | Eryurek et al. |
| 2002/0156872 A1 | 10/2002 | Brown |
| 2002/0184521 A1 | 12/2002 | Lucovsky et al. |
| 2002/0193888 A1 | 12/2002 | Wewalaarachchi et al. |
| 2002/0199123 A1 | 12/2002 | McIntyre et al. |
| 2003/0005169 A1 | 1/2003 | Perks et al. |
| 2003/0009754 A1 | 1/2003 | Rowley et al. |
| 2003/0014500 A1 | 1/2003 | Schleiss et al. |
| 2003/0028269 A1 | 2/2003 | Spriggs et al. |
| 2003/0028683 A1 | 2/2003 | Yorke et al. |
| 2003/0033037 A1 | 2/2003 | Yuen et al. |
| 2003/0041130 A1 | 2/2003 | Harrisville-Wolff et al. |
| 2003/0084201 A1 | 5/2003 | Edwards et al. |
| 2003/0126136 A1 | 7/2003 | Omoigui |
| 2003/0153988 A1 | 8/2003 | Shepard et al. |
| 2003/0191803 A1 | 10/2003 | Chinnici et al. |
| 2003/0200062 A1 | 10/2003 | Dessureault et al. |
| 2003/0226009 A1 | 12/2003 | Maeda et al. |
| 2003/0236576 A1 | 12/2003 | Resnick et al. |
| 2003/0236577 A1 | 12/2003 | Clinton |
| 2004/0021679 A1 | 2/2004 | Chapman et al. |
| 2004/0036698 A1 | 2/2004 | Thurner et al. |
| 2004/0059929 A1 | 3/2004 | Rodgers et al. |
| 2004/0075689 A1 | 4/2004 | Schleiss et al. |
| 2004/0075857 A1 | 4/2004 | Akiyoshi et al. |
| 2004/0078182 A1 | 4/2004 | Nixon et al. |
| 2004/0133487 A1 | 7/2004 | Hanagan et al. |
| 2004/0153804 A1 | 8/2004 | Blevins et al. |
| 2004/0162792 A1 | 8/2004 | Satou et al. |
| 2004/0181746 A1 | 9/2004 | McLure et al. |
| 2004/0186927 A1 | 9/2004 | Eryurek et al. |
| 2004/0199925 A1 | 10/2004 | Nixon et al. |
| 2004/0205656 A1 | 10/2004 | Reulein et al. |
| 2004/0249483 A1 | 12/2004 | Wojsznis et al. |
| 2004/0267515 A1 | 12/2004 | McDaniel et al. |
| 2005/0005079 A1 | 1/2005 | Boudou et al. |
| 2005/0015439 A1 | 1/2005 | Balaji et al. |
| 2005/0027376 A1 | 2/2005 | Lucas et al. |
| 2005/0039034 A1 | 2/2005 | Doyle et al. |
| 2005/0062677 A1 | 3/2005 | Nixon et al. |
| 2005/0096872 A1 | 5/2005 | Blevins et al. |
| 2005/0164684 A1 | 7/2005 | Chen et al. |
| 2005/0182758 A1 | 8/2005 | Seitz et al. |
| 2005/0197786 A1 | 9/2005 | Kataria et al. |
| 2005/0197803 A1 | 9/2005 | Eryurek et al. |
| 2005/0197805 A1 | 9/2005 | Eryurek et al. |
| 2005/0197806 A1 | 9/2005 | Eryurek et al. |
| 2005/0217971 A1 | 10/2005 | Kim |
| 2005/0222698 A1 | 10/2005 | Eryurek et al. |
| 2005/0257204 A1 | 11/2005 | Bryant et al. |
| 2005/0277403 A1 | 12/2005 | Schmidt et al. |
| 2006/0031354 A1 | 2/2006 | Patrick et al. |
| 2006/0031481 A1 | 2/2006 | Patrick et al. |
| 2006/0136555 A1 | 6/2006 | Patrick et al. |
| 2006/0259524 A1 | 11/2006 | Horton |
| 2007/0006149 A1 | 1/2007 | Resnick et al. |
| 2007/0061786 A1 | 3/2007 | Zhou et al. |
| 2007/0078529 A1 | 4/2007 | Thiele et al. |
| 2007/0106761 A1 | 5/2007 | Beoughter et al. |
| 2007/0129917 A1 | 6/2007 | Blevins et al. |
| 2007/0130572 A1 | 6/2007 | Gilbert et al. |
| 2007/0150081 A1 | 6/2007 | Nixon et al. |
| 2007/0165031 A1 | 7/2007 | Gilbert et al. |
| 2007/0168060 A1 | 7/2007 | Nixon et al. |
| 2007/0168065 A1 | 7/2007 | Nixon et al. |
| 2007/0170037 A1 | 7/2007 | Kuroda |
| 2007/0179641 A1 | 8/2007 | Lucas et al. |
| 2007/0198929 A1 | 8/2007 | Dieberger et al. |
| 2007/0211079 A1 | 9/2007 | Nixon et al. |
| 2007/0240070 A1* | 10/2007 | Eldridge et al. ............ 715/763 |
| 2007/0244582 A1 | 10/2007 | Wolf |
| 2007/0282480 A1 | 12/2007 | Pannese et al. |
| 2008/0034367 A1 | 2/2008 | Patrick et al. |
| 2008/0066004 A1 | 3/2008 | Blevins et al. |
| 2008/0116035 A1 | 5/2008 | Ogimura |
| 2008/0140760 A1 | 6/2008 | Conner et al. |
| 2008/0300698 A1 | 12/2008 | Havekost et al. |
| 2009/0249237 A1 | 10/2009 | Jundt et al. |
| 2010/0050097 A1* | 2/2010 | McGreevy et al. ............ 715/762 |
| 2010/0107108 A1* | 4/2010 | Husoy et al. ................. 715/777 |

FOREIGN PATENT DOCUMENTS

| | | |
|---|---|---|
| EP | 0 813 129 | 12/1997 |
| EP | 0 875 826 | 11/1998 |
| EP | 1 030 251 A1 | 8/2000 |
| EP | 1 122 652 | 8/2001 |
| EP | 1 204 033 | 5/2002 |
| EP | 1 284 446 | 2/2003 |
| EP | 1 538 619 A1 | 6/2005 |
| GB | 2 328 523 | 2/1999 |
| GB | 2 370 665 | 7/2000 |
| GB | 2 348 020 | 9/2000 |
| GB | 2 349 958 | 11/2000 |
| GB | 2 355 545 A | 4/2001 |
| GB | 2 371 884 | 8/2002 |
| GB | 2 372 365 | 8/2002 |
| GB | 2 377 045 | 12/2002 |
| GB | 2 395 801 | 6/2004 |
| GB | 2 398 659 | 8/2004 |
| GB | 2 400 465 | 10/2004 |
| GB | 2 415 809 A | 1/2006 |
| GB | 2 417 574 | 3/2006 |
| GB | 2 417 575 | 3/2006 |
| GB | 2 418 030 | 3/2006 |
| GB | 2 418 031 | 3/2006 |
| JP | 1-298389 | 12/1979 |
| JP | 1-120593 | 5/1989 |
| JP | 2-310602 | 12/1990 |
| JP | 3-257509 | 11/1991 |
| JP | 5-54277 | 3/1993 |
| JP | 6-26093 | 2/1994 |
| JP | 7-036538 | 2/1995 |
| JP | 7-248941 | 9/1995 |
| JP | 8-314760 | 11/1996 |
| JP | 9-134213 | 5/1997 |
| JP | 9-330013 | 12/1997 |
| JP | 11-007315 | 1/1999 |
| JP | 2000-050531 | 2/2000 |
| JP | 2000-311004 | 11/2000 |
| JP | 2000-346299 A | 12/2000 |
| JP | 2002-140114 | 5/2002 |
| JP | 2002-215221 | 7/2002 |
| JP | 2002-258936 | 9/2002 |
| JP | 2002-303564 | 10/2002 |
| JP | 9-288512 | 11/2007 |
| WO | WO-91/19237 A1 | 12/1991 |
| WO | WO-95/04314 A1 | 2/1995 |
| WO | WO-97/27540 A1 | 7/1997 |
| WO | WO-97/38362 | 10/1997 |
| WO | WO-97/45778 | 12/1997 |
| WO | WO-98/53398 | 11/1998 |
| WO | WO-00/23798 | 4/2000 |
| WO | WO-00/70417 | 11/2000 |
| WO | WO-01/09690 | 2/2001 |
| WO | WO-01/65322 A1 | 9/2001 |
| WO | WO-02/071169 | 9/2002 |
| WO | WO-03/003198 | 1/2003 |
| WO | WO-03/038584 | 5/2003 |
| WO | WO-03/048922 A1 | 6/2003 |
| WO | WO-03/075206 A2 | 9/2003 |
| WO | WO-2004/025437 A2 | 3/2004 |
| WO | WO-2004/086160 A1 | 10/2004 |
| WO | WO-2005/107409 | 11/2005 |
| WO | WO-2005/107410 | 11/2005 |
| WO | WO-2005/107416 | 11/2005 |
| WO | WO-2005/109122 | 11/2005 |
| WO | WO-2005/109123 | 11/2005 |
| WO | WO-2005/109124 | 11/2005 |
| WO | WO-2005/109125 | 11/2005 |

(56) References Cited

FOREIGN PATENT DOCUMENTS

| | | |
|---|---|---|
| WO | WO-2005/109126 | 11/2005 |
| WO | WO-2005/109127 | 11/2005 |
| WO | WO-2005/109128 | 11/2005 |
| WO | WO-2005/109129 | 11/2005 |
| WO | WO-2005/109130 | 11/2005 |
| WO | WO-2005/109131 | 11/2005 |
| WO | WO-2005/109250 | 11/2005 |
| WO | WO-2005/119381 | 12/2005 |
| WO | WO 2008104458 A1 * | 9/2008 |
| WO | WO-2010/149302 A1 | 12/2010 |

OTHER PUBLICATIONS

"Powerful Solutions for Digital Plants", Mimic Simulation v2.6, Mynah Technologies 2003, pp. 1-15.
Arzen, "Using Real-Time Expert Systems for Control System Prototyping," *Proceedings of the International Conference on Systems, Man and Cybernetics*, 3:25-30 (1993).
Bailey, "Elsag Bailey automation", approximately 1993.
Bailey, "Introducing Bailey Evolution 90TM . . . The Sound Investment Strategy for Process Automation", 1993.
Bailey, "Wide-Range, Fully Compatible Family of Process Automation and Management Systems", 1993.
CAMO product datasheet, "The Unscrambler 9.6," www.camo.com.
Chen, "Real-Time Management in the Distributed Environment," Ph.D. Thesis (1999).
Computer Products, "Unbundling the DCS", approximately 1992.
Developers.sun.com, "Core J2EE Patterns—Data Access Object," Core J2EE Pattern Catalog (2004). Retrieved from the Internet on Feb. 1, 2006: URL:httC4p://web.archive.org/web/20040414043406/java.sun.com/blueprints/corej2eepatterns/Patterns/C5DataAccessObjects.html.
Fisher-Rosemount Systems, Inc., DeltaV Bulk Edit, pp. 1-12 (2002).
Fisher-Rosemount, "Managing the Process Better", Dec. 1993.
Fisher-Rosemount, "Managing the Process Better", Sep. 1993.
FOLDOC, "Declarative Language," Retrieved from the Internet on Jul. 30, 2007: URLhttp://ftp.sunet.se/foldoc/foldoc.cgi?declarative+language.
Han et al., "Web Based rSPC (realtime Statistical Process Control) System Supporting XML Protocol," ISIE, vol. 1, pp. 399-403 (2001).
Honeywell "UDC 6000 Process Controller", Aug. 1992.
Honeywell, "Process Manager Specifiction and Technical Data", Sep. 1991.
Honeywell, "TDC 3000 Overview", approximately 1992.
Honeywell, "TDC 3000 Process Manager", approximately 1992.
Kopp, About.com, C++ Tutorial—Lesson 17: Classes, Members and Methods, Retrieved from the Internet on Apr. 27, 2005: URL:http://www.cplus.about.com/od/beginnerctutorial/l/aa070602a.htm.
Kopp, About.com, C++ Tutorial—Lesson 17: Classes, Members and Methods, Defining Classes, Retrieved from the Internet on Apr. 27, 2005: URL:http://www.cplus.about.com/od/besinnerctutorial/l/aa070602b.htm.
Kopp, About.com, C++ Tutorial—Lesson 17: Classes, Members and Methods, Defining Methods, Retrieved from the Internet on Apr. 27, 2005: URL:http://www.cplus.about.com/od/beginnerctutorial/l/aa070602c.htm.
Kopp, About.com, C++ Tutorial—Lesson 29: Inheritance Introduction, Retrieved from the Internet on Apr. 27, 2005: URL:http://www.cplus.about.com/od/beginnerctutorial/l/aa120502a.htm.
Kopp, About.com, C++ Tutorial—Lesson 29: Inheritance, Retrieved from the Internet on Apr. 27, 2005: URL:http://www.cplus.about.com/od/beginnerctutorial/l/aa120502b.htm.
Kopp, About.com, C++ Tutorial—Lesson 29: Inheritance, Continued, Retrieved from the Internet on Apr. 27, 2005: URL:http://www.cplus.about.com/od/beginnerctutorial/l/aa12050c.htm.
Kopp, About.com, C++ Tutorial—Lesson 9: Introduction to Classes, Defining Classes, Retrieved from the Internet on Apr. 27, 2005: URL:http://www.cplus.about.com/od/beginnerctutorial/l/aa041002b.htm.
Kopp, About.com, C++ Tutorial—Lesson 9: Introduction to Classes, Object Terminology, Retrieved from the Internet on Apr. 27, 2005: URL:http://www.cplus.about.com/od/beginnerctutorial/l/aa041002e.htm.
Kopp, About.com, C++ Tutorial—Lesson 9: Introduction to Classes, Using Objects, Retrieved from the Internet on Apr. 27, 2005: URL:http://www.cplus.about.com/od/beginnerctutorial/l/aa041002d.htm.
Kurpis, "The New IEEE Standard Dictionary of Electrical and Electronics Terms (Including Abstracts of All Current IEEE Standards)," Fifth Ed., Christopher J. Booth, Editor, pp. 317 (1993).
Leeds et al., "Make Your Automation Plan a Reality: MAX 1000", approximately 1990.
Mehta et al., "Feedfoward Neural Networks for Process Identification and Prediction," Neural Network and Experty Systems Presentation (2001).
Mohr et al., "BizTalk and Application Integration—Translating Between Message Specification: BizTalk Mapper," Professional BizTalk, pp. 1-3 (2001).
MSDN Magazine, "A First Look at Writing and Deploying Apps in the Next Generation of Windows," Retrieved from the Internet on Aug. 21, 2007: URL http://msdn.microsoft.com/msdnmag/issues/04/01/DevelopingAppsforLonghorn/?print=true.
MSDN Magazine, "Create Real Apps Using New Code and Markup Model," Retrieved from the Interent on Aug. 21, 2007: URL http://msdn.microsoft.com/msdnmag/issues/04/01/avalon/?print=true.
MSDN, "Introduction to Windows Presentation Foundation," (2008), Retreived from the Internet on Aug. 13, 2008: URL: http://msdn.microsoft.com/en-us/library/aa970268(printer).aspx.
Nahavandi et al., "A Virtual Manufacturing Environment with an Element of Reality," *Advanced Factory Automation*, Conf. Pub. 398: 624-629 (1994).
OPC Foundation, "What is OPC?" Retrieved from the Internet on Aug. 21, 2007: URL http://www.opcfoundation.org/Default.aspx/01_about/01_whatis.asp?MID=AboutOPC.
Reliance Electric Company, "Multitasking Capability Simplifies Process Control Design", approximately late 1980s, by Angelo J. Notte.
StatSoft product datasheet, "Statistica, Multivariate Statistical Process Control," www.statsoft.com.
Sztipanovits et al. "Modeling, Model, Interpretation and Intelligent Control" Proc. of the Third IEEE International Symposium on Intelligent Control, pp. 46-50 (1989).
Toshiba, "Toshiba Integrated Control Systems", Nov. 1990.
Tzovla et al., "Abnormal Condition Management Using Expert Systems," Neural Network and Expert Systems Presentation (2001).
Umetrics product datasheet, "SIMCA-P 11" and "SIMCA-P+ 11," www.umetrics.com.
W3C, "XSL Transformations (XSLT)," W3C Recommendation, pp. 3 (1999).
Wikipedia, "Application Programming Interface," Retrieved from the Interent on Aug. 21, 2007: URL http://en.wikipedia.org/wiki/Application_programming_interface.
Wikipedia, "Extensible Application Markup Language," Retreived from the Internet on Jul. 30, 2007: URL http://en.wikipedia.org/wiki/Extensible_Application_Markup_Language.
Wikipedia, "Vector Graphics," Retreived from the Interent on Aug. 21, 2007: URL http://en.wikipedia.org/wiki/Vector_graphics.
Yang, "Design Issues and Implementation of Internet-Based Process Control System," *Control Engineering Practice*, pp. 709-720 (2001).

\* cited by examiner

METHODS FOR A DATA DRIVEN INTERFACE BASED ON RELATIONSHIPS BETWEEN PROCESS CONTROL TAGS

TECHNICAL FIELD

The present disclosure relates generally to process plants and, more particularly, to the utilization of relationships between process control entities to drive navigation in a graphical human-machine interface.

DESCRIPTION OF THE RELATED ART

Distributed process control systems, like those used in chemical, petroleum or other processes, typically include one or more process controllers communicatively coupled to one or more field devices via analog, digital or combined analog and digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocols, like the FOUNDATION™ Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being executed in the field devices, such as HART and Fieldbus field devices. The control modules in the controller send the control signals over the communication lines to the field devices to thereby control the operation of the process.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, that are objects in an object oriented programming protocol and perform functions within the control scheme based on inputs thereto and provide outputs to other function blocks within the control scheme. The configuration application may also allow a designer to create or change operator interfaces or human-machine interfaces (HMI) which are used by a viewing application to display data to an operator and to enable the operator to change settings, such as set points, within the process control routine. Each dedicated controller and, in some cases, field devices, stores and executes a controller application that runs the control modules assigned and downloaded thereto to implement actual process control functionality. The viewing applications, which may be run on one or more operator workstations, receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As the number and type of control and support applications used in a process control environment have increased, different graphical display applications have been provided to enable users to effectively configure and use these applications. For example, graphical display applications have been used to support control configuration applications to enable a configuration engineer to graphically create control programs to be downloaded to the control devices within a process plant. Additionally, graphical display applications have been used to enable control operators to view the current functioning of the process plant, or areas of the process plant, to enable maintenance personnel to view the state of hardware devices within the process plant, to enable simulation of the process plant, etc.

Some process control configuration applications that are supported by graphical display applications presently include a library of template objects, such as function block template objects and, in some cases, control module template objects, that are used to create a control strategy for a process plant. The template objects have default parameters, settings and methods associated therewith and the engineer using a graphical configuration application can select these template objects and essentially place copies of the selected template objects into a configuration screen to develop a control module. The template objects may also include one or more sub-elements or primitives of the template object. For example, a furnace template object may include a valve, valve fitting, and various text areas as sub-elements. During the process of selecting and placing the template objects into the configuration screen, the engineer interconnects the inputs and outputs of these objects and changes their parameters, names, tags and other parameters to create a specific control module for a specific use in the process plant. After creating one or more such control modules, the engineer can then instantiate the control module and download it to the appropriate controller or controllers and field devices for execution during operation of the process plant.

Thereafter, the engineer may use a different graphical display creation application to create one or more displays for operators, maintenance personnel, etc. within the process plant by selecting and building display objects in the display creation application. These displays are typically implemented on a system wide basis in one or more of the workstations and provide preconfigured displays to the operator or maintenance persons regarding the operating state of the control system or the devices within the plant. These displays generally take the form of alarming displays that receive and display alarms generated by controllers or devices within the process plant, control displays indicating the operating state of the controllers and other devices within the process plant, maintenance displays indicating the functioning state of the devices within the process plant, etc. However, these displays are generally preconfigured to navigate, in known manners, from one representation of a process control entity to another representation of a process control entity. In some systems, displays are created by a graphic depiction that represents a physical or a logical element that is logically or physically related to other physical or logical elements, such that a use navigates from one to another. When configuring the operator displays, various graphical items are typically placed to represent apart of the plant or control strategies. Links may be entered directly (e.g., hardcoded) into the display to navigate or open related displays. The graphic on the display screen may change in response to the selection of a graphical item or representation of a process entity to view related entities.

For example, a tank template graphical display includes a pump and that pump may include numerous primary shapes such as an ellipse, rectangles, lines, or other shapes. When placed onto the screen, individual graphic items may be interconnected on the screen in a manner that provides some information or display of the inner-workings of the process plant to users. To animate the graphic display, the display creator must manually tie each of the graphical items to data generated within the process plant, such as data measured by sensors or indicative of valve positions, etc. by specifying a communication link between the graphic item and the relevant data source within the process plant.

Entities in the plant or process control system have unique tags, such as device names or control loops. Currently, a display may be created and configured to show set points, process variables, alarms and other process results. An example may be to show a symbol beside a graphical item if the control tag it represents has an alarm. Additionally, control tags may be provided to the graphic at runtime allowing some amount of reuse of a display across the system. When configuring the process control system, many relationships are created. That is, some relationships between physical and/or logical entities may be created and captured when the plant is engineered. Still others are captures when the process control system is engineered.

However, there are many relationships that may not be created as a standard part of process control configuration, but are nonetheless important for the successful operation of the plant. Among these relationships are device to standard operating procedure (SOP) documents, plant equipment to material flowing through as provided in Materials Safety Data Sheet (MSDS) and operator notes for a device. These relationships may be captured in various databases, spreadsheets and other mechanisms. However, these relationships are generally not utilized or reflected in the operator displays.

Accordingly, it is desirable to make these relationships available in the graphic without having to hard code the relationship into the graphic. In many cases, simply navigating to a related item is beneficial. An example is showing/hiding items based on if a Control Module Tag has a relationship to a Device Tag. If present, a button or other graphical representation may be made visible that allows a user to navigate to the device faceplate (e.g., display of device information) to display diagnostic data such as health.

When configuring the operator displays, the person creating the display typically places various graphical items to represent some part of the plant or control strategies. Links may be placed on the display to navigate or open related displays. The link may be entered into the display directly (i.e., hard coded). However, it is desirable to bring up a display based upon some unique tag that can be associated to the correct display. It is desirable to capture these relationships and make them available to the HMI.

SUMMARY

A system and method for defining relationships between physical/logical entities within a process plant is disclosed with the specific premise of making relationships available to the where those relationships are not defined during the plant or control system configuration process. The system and method defines relationships between entities by establishing relationships between process control tags, where each entity is uniquely identified by a process control tag. A data store is populated with relationships extracted from various configuration databases, including those for control system configuration, plant engineering, user-defined spreadsheets, customer databases, etc. Each relationship is stored as a relationship key and a relationship value. The relationship key specifies the relationship between the entities and the relationship value uniquely identifies of the relationship. The relationship data may then be used to create navigational links within a graphical interface, such that the display of a representation of an entity automatically invokes relationships with other entities as navigational links to those other entities. As a result, almost any entity may be navigationally linked within the graphical interface, including devices, controllers, areas, units, loops, etc. as well as documentation such as operating procedures and Materials Safety Data Sheets. Thus, relationships that may exist within a plant, but are not otherwise defined during the initial configuration process, may be defined and implemented within the process control system, without impacting control performance.

DETAILED DESCRIPTION

Figure 1:
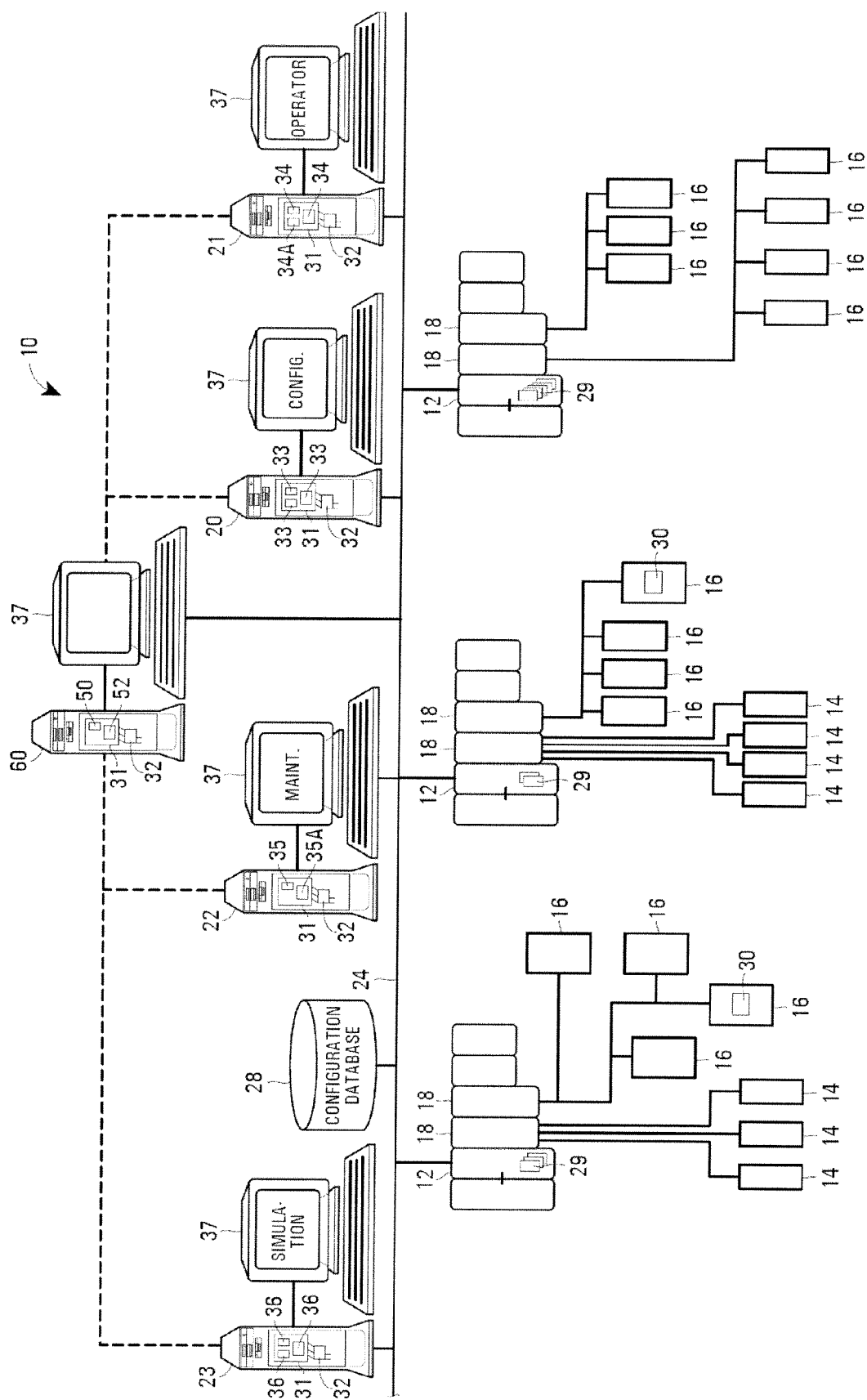
FIG. 1 is a block diagram of a distributed process control network located within a process plant including operator workstations that implement display routines and other applications associated with various functions within the process plant, as well as a workstation that provides system level graphical support that may be used to create and resize composite shapes and graphic displays for each of the various functional areas of the plant.

FIG. 1 illustrates an example process plant 10 in which system level graphical support is provided to various functional areas of the plant 10. As is typical, the process plant 10 includes a distributed process control system having one or more controllers 12, each connected to one or more field devices 14 and 16 via input/output (I/O) devices or cards 18 which may be, for example, Fieldbus interfaces, Profibus interfaces, HART interfaces, standard 4-20 ma interfaces, etc. The controllers 12 are also coupled to one or more host or operator workstations 20-23 via a data highway 24 which may be, for example, an Ethernet link. A database 28 may be connected to the data highway 24 and operates as a data historian to collect and store parameter, status and other data associated with the controllers and field devices within the plant 10 and/or as a configuration database that stores the current configuration of the process control system within the plant 10 as downloaded to and stored within the controllers 12 and field devices 14 and 16. The database 28 may additionally store graphical objects created in the manner described herein to provide graphical support within the process plant 10. While the controllers 12, I/O cards 18 and field devices 14 and 16 are typically located down within and distributed throughout the sometimes harsh plant environment, the operator workstations 20-23 and the database 28 are usually located in control rooms or other less harsh environments easily assessable by controller or maintenance personnel. However, in some cases, handheld devices may be used to implement these functions and these handheld devices are typically carried to various places in the plant.

As is known, each of the controllers 12, which may be by way of example, the DeltaV™ controller sold by Emerson Process Management, stores and executes a controller application that implements a control strategy using any number of different, independently executed, control modules or blocks 29. Each of the control modules 29 can be made up of what are commonly referred to as function blocks wherein each function block is a part or a subroutine of an overall control routine and operates in conjunction with other function blocks (via communications called links) to implement process control loops within the process plant 10. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 10 illustrated in FIG. 1, the field devices 14 and 16 connected to the controllers 12 may be standard 4-20 ma devices, may be smart field devices, such as HART, Profibus, or FOUNDATION™ Fieldbus field devices, which include a processor and a memory, or may be any other desired type of devices. Some of these devices, such as Fieldbus field devices (labeled with reference number 16 in FIG. 1), may store and execute modules, or sub-modules, such as function blocks, associated with the control strategy implemented in the controllers 12. Function blocks 30, which are illustrated in FIG. 1 as being disposed in two different ones of the Fieldbus field devices 16, may be executed in conjunction with the execution of the control modules 29 within the controllers 12 to implement process control, as is well known. Of course, the field devices 14 and 16 may be any types of devices, such as sensors, valves, transmitters, positioners, etc. and the I/O devices 18 may be any types of I/O devices conforming to any desired communication or controller protocol such as HART, Fieldbus, Profibus, etc.

In the process plant 10 of FIG. 1, the workstations 20-23 may include various applications that are used for various different functions performed by the same or different personnel within the plant 10. Each of the workstations 20-23 includes a memory 31 that stores various applications, programs, data structures, etc. and a processor 32 which may be used to execute any of the applications stored in the memory 31. In the example illustrated in FIG. 1, the workstation 20 is designated as a configuration workstation and includes one or more configuration applications 33 which may include, for example, control module creation applications, operator interface applications and other data structures which can be accessed by any authorized configuration engineer to create and download control routines or modules, such as the control modules 29 and 30, to the various controllers 12 and devices 16 of the plant 10. The workstation 21 is generally illustrated in FIG. 1 as a control operator viewing workstation and includes a number of display applications 34 which may provide a control operator with various displays during operation of the process plant 10 to enable the operator to view and control what is happening within the process plant 10 or in various sections of the plant. The applications 34 may include support applications 34a such as control diagnostic applications, tuning applications, report generation applications or any other control support applications that may be used to assist a control operator in performing control functions. Similarly, the workstation 22 is illustrated as a maintenance viewing workstation and includes a number of maintenance applications 35 that may be used by various maintenance personnel to view the maintenance needs of the plant 10, to view the operating or working condition of various devices 12, 14, 16, etc. Of course, the applications 35 may include support applications 35a such as maintenance diagnostic applications, calibration applications, vibration analysis applications, report generation applications or any other maintenance support applications that may be used to assist a maintenance person in performing maintenance functions within the plant 10. Additionally, the workstation 23 is indicated as a simulation workstation which includes a number of simulation applications 36 that may be used to simulate operation of the plant 10 or various sections of the plant 10 for any number of purposes, including for training purposes, for plant modeling purposes to assist in plant maintenance and control, etc. As is typical, each of the workstations 20-23 includes a display screen 37 along with other standard peripheral devices, like a keyboard, a mouse, etc.

Of course, while the various configuration, control, maintenance and simulation applications 33-36 are illustrated in FIG. 1 as being located in different workstations dedicated to one of those functions, it will be understood that the various applications 33-36 associated with these or other plant functions may be located in and executed in the same or different workstations or computers within the plant 10, depending on the needs and set up of the plant 10. Thus, for example, one or more simulation applications 36 and control applications 33 may be executed in the same workstation 20-23, while different individual simulation applications 36 or different individual control applications 33 may be executed in different ones of the workstations 20-23.

As described in U.S. Pub. Patent Appl. No. 2007/0132779 entitled "Graphical Element with Multiple Visualizations in a Process Environment" filed on May 4, 2005, the contents of which are incorporated by reference herein, to alleviate the inefficiency of different graphics editors and packages for each plant level, and to provide for more widely usable and understandable graphics within the plant 10, a graphical support layer is provided at a system level of the process plant 10 to support the graphic display and data structure needs of each of the various functional areas of the plant 10, including the configuration, operator viewing, maintenance viewing, simulation and other functional areas of the plant 10. This system level of support is depicted diagrammatically in FIG. 2, which illustrates a plant operational level 40, a plant functional level 42 and a system level 44. As will be understood from FIG. 2, the plant operational level 40 includes the controllers 12, field devices 14, 16, etc. which execute the control routines or modules 29 and 30, as well as other software run within the plant 10 to implement plant operations during runtime of the plant. The plant functional level 42 is depicted as including a configuration function block 46, a control function block 47, a maintenance function block 48 and a simulation block 49, although other or different functions, such as an engineering and a business function, could be provided as well. The configuration function block 46 implements the configuration routines 33 which interface or communicate with components within the plant operational level 40 to provide control strategies or control modules thereto. The control function block 47 includes the control viewing and other applications 34 and 34*a* which also interface or communicate typically directly with the various physical and logical components within the plant operational level 40 to implement operator initiated changes within the plant 10, to provide information to the operator via control displays 34, to acquire data for the control applications 34*a*, etc. The maintenance function block 48 includes the maintenance routines and applications 35 and 35*a* that interface or communicate with various physical and logical components within the plant operational level 40 to implement maintenance procedures, to collect maintenance data, to provide maintenance data or information to a maintenance person via maintenance displays 35, to run diagnostic applications 35*a*, etc. Likewise, the simulation function block 49 includes simulation routines 36 which implement simulations of the plant 10 and which may be communicatively coupled to components within the plant operational level 40 to obtain data regarding the plant 10.

Figure 2:
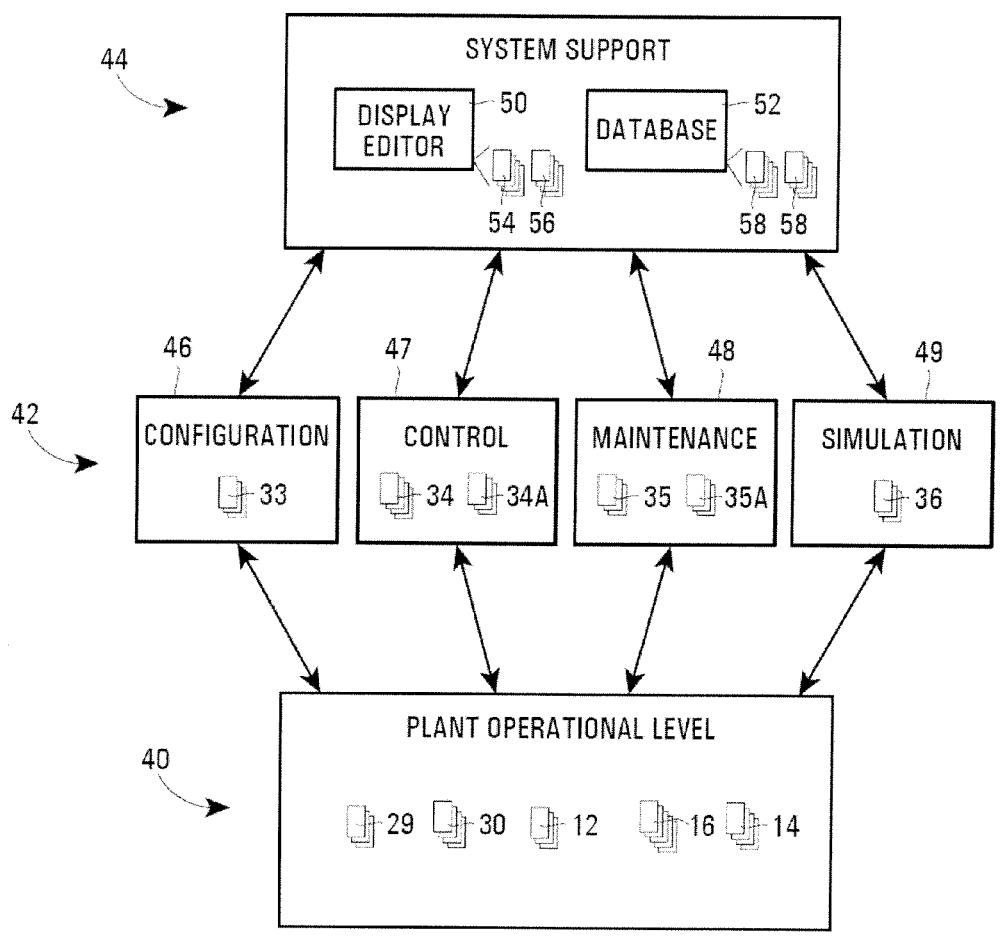
FIG. 2 is a logical block diagram illustrating the integration of system level graphical support within a process plant control, viewing and simulation system.

As illustrated in FIG. 2, the system level support layer 44 ties into and supports each of the function blocks 46-49 within the plant functional layer 42 to enable, for example, the creation and maintenance of common database and display structures, such as software objects, composite shapes and graphic displays for use in the various functional areas 46-49. More particularly, the system level support layer 44 includes application, database and graphical support elements that enable the graphical activities performed in each of the function blocks 46-49 to be integrated together, or to be developed using common database structures and composite shapes created at the system support layer 44.

The system support layer 44 may include a graphical editor 50 and a graphical object database 52. The graphical editor 50 may be used to create graphical elements 54 and graphic displays 56, while the graphic object database 52 stores the graphical elements 54 and displays 56 in a memory accessible by the editor 52 and by the various applications in the blocks 46-49. The database 52 may also store other objects 58 such as sub-elements for graphical elements 54, and data structures that connect the composite shapes 54 to individual hardware and software elements within the plant operational level 40. Additionally, the database 52 may store templates, sub-elements, and primitives that may be used to create further graphical elements, or displays. As will be understood from FIG. 2, the graphic display elements 54, displays 56 and other database structures 58 may be used by any and all of the functional blocks 46-49 to create and use graphics associated with those functional blocks.

Generally speaking, the system level support block 44 provides a manner of integrating the graphics used in the process plant 10 of FIG. 1 in all of the functional areas 46-49, to thereby reduce or eliminate the necessity of repeatedly creating different graphical elements for the same plant equipment in different functional contexts, and to make it easy for a user in each of the functional areas 46-49 to tie into data associated with the equipment being displayed in graphical views associated with those functional areas. As will be understood, the system level support layer 44 may be used to provide graphics and database support for multiple applications in each of the functional areas 46-49, for different applications in different ones of the functional areas 46-49, etc.

Referring again to FIG. 1, the system level support block 44 may be implemented using an additional workstation or user interface 60 which may be connected to each of the other workstations 20-23. The workstation 60 may generally store the graphics editor 50 and database 52 and may store the other elements 54, 56 and 58 if so desired. Additionally, the workstation 60 may be communicatively connected to the workstations 20-23 via the databus 24, via separate wired or wireless communication connections (illustrated by dotted lines in FIG. 1) or in any other desired manner. In the configuration illustrated in FIG. 1, the workstation 60 stores and executes the display editor 50 to enable a user to create composite shapes that include sub-elements and other composite shapes. and to group the shapes into one or more graphic displays or display modules. These display modules may be then stored in the database 52 to be accessed and used by various functional blocks 46-49 illustrated in FIG. 2 and implemented on the various workstations 20-23. While, for the sake of illustration, the functionality of the system level block 44 and the function level blocks 46-49 is illustrated as being implemented on different or separate workstations 20-23 and 60 in FIG. 1, it will be understood that any or all of the applications associated with any of these various blocks could be implemented on the same or different workstations or other computers within or associated with the process plant 10. Thus, the graphics editor 50 may be stored in and executed on any of the other workstations 20-23 or on any other computer associated with the plant 10 and need not be in a stand-alone or separate computer.

As discussed above, the system level layer 44 of FIG. 2 implements system level display and database objects, which can be used in a variety of the functional environments as well as to provide higher level display capabilities. Generally speaking, the display objects created at the system level 44 of FIG. 2 can be categorized as graphical elements and graphic displays. Graphical elements are generally display objects that are associated with a particular physical entity within the plant, such as a hardware device like a valve, a sensor, a pump, a controller, a tank, a reactor, a burner, a pipe, a pipe fitting, equipment in a process, etc., or with a particular logical entity within the plant, such as a control algorithm, SOP documents, MSDS documents, alarms, function blocks, function block parameters, process control modules, equipment modules, process control module steps, process control module transitions, process control module actions, process control system recipes, process control system nodes, etc. Graphic displays are generally made up of a set of interconnected graphical elements and are used to represent and model more complicated sets of logical and/or physical entities within a plant, such as a loop, a unit, an area, etc. and include interconnections between different hardware units. However, graphical displays may also represent and model specific physical and/or logical entities within the plant, such as faceplate displays, detail displays, primary control displays, user-defined displays, diagnostic displays, etc. each of which may pertain to a particular entity within the plant, such as a device, for example. Graphical elements may be made up of a plurality of sub-elements that may, themselves, be graphical elements. For example, a device graphical element within a device faceplate graphic display may include one or more graphical elements pertaining to relationships or process control tags associated with the device. Additionally, graphic displays may include graphs, charts and other data provided from the plant, from other applications, such as diagnostic and business applications running in the workstations 20-23 and 60, etc. Each graphical element and graphical display may be associated with a particular graphical element identification, which uniquely identifies the graphical element or graphical display. As will be discussed further below, an operator display or other human machine interface (HMI) may call upon a particular graphical element and/or graphical display using the graphical element identification in order to render a display of information related to the process control entity to which the graphical element or graphical display pertains.

Generally speaking, relationships between physical and/or logical entities may exist at different levels, both logically, and physically, several examples of which were disclosed above. More particularly, there are interconnections between logical and/or physical process control entities. Many of these relationships may be created at the time of plant configuration, process control configuration, operator display configuration or at other times of configurations. In addition, some relationships may be created by the operator, may be created at runtime by either the HMI or may be the process control system, and may be pushed into a runtime or operations relationship store described further below. This is because once the configurations have been established, the relationships are known. For example, at the time of plant configuration, relationships among hierarchical levels (e.g., plant to areas, areas to units, units to loops, etc.) may be known, along with lateral relationships (e.g., area to area, unit to unit, etc.). As another example, at the time of process control configuration, the interconnections and relationships among devices, function blocks and control algorithms may become known (e.g., control algorithm to contained function blocks, control algorithm to field device, next/previous equipment in a process, process alarms to device alarms, etc.). As a further example, at the time of operator display configuration, relationships amongst graphical elements and graphical displays may be established, as well as relationships between the graphical elements/displays and process control elements (e.g., control algorithm to faceplate display, device to diagnostic display, device to faceplate display, etc.). That is, the various graphical elements and displays are pre-established in the operator display to represent some part of the plant or process control system or control strategy. Links are then placed in the operator display to establish navigational links between graphical elements and/or graphical displays. In many instances, these links are entered directly (e.g., hard coded). Further, even after configuration, updates to the relationships may be applied, particularly for those occasions where the relationships are changed. For example, changes in the configuration may result in adding a relationship, deleting a relationship, moving an object to a new parent, etc. Accordingly, it should be well understood that many relationships may exist and/or be created within a process control system or plant at the time of configuration, and that these relationships extend to a variety of different levels and among various physical and logical entities.

Further, relationships established during configuration are generally static, particularly once the plant or process control system is in operation. That is, the relationships do not change once established, unless an engineer or other appropriate personnel changes the configuration. These relationships are often stored in various configuration databases, such as a process control system configuration database, a plant engineering database, etc.

There are many aspects to configuring a distributed process control system, including, but not limited to, I/O, control strategy, batch, object linking and embedding (OLE) for process control (OPC) integration, history, displays, etc. The configuration system, and underlying database, provides tools and infrastructure for configuring a integrated solution to a process control system project. Configuration systems, such as DeltaV™ sold by Fisher-Rosemount Systems, Inc. of Austin, Tex., and configuration system applications, such as Explorer, Control Studio, Recipe Studio, Graphics Studio and User Manager each sold by Fisher-Rosemount Systems, Inc. of Austin, Tex., are used to configure the entire process control strategy, displays, I/O, alarm strategies, history and events, users and their roles, and every other part of the process control system.

In addition to relationships established during configuration, additional relationships may be established following process control configuration or operator display configuration which are also useful in terms of plant operation and are useful to a user of the operator display. For example, an end user may want provide additional configurations to establish a relationship between a device and a standard operator procedure (SOP) for that device, establish a relationship between plant equipment and material flowing through as provided in Material Safety Data Sheets (MSDS), or establish a relationship between a device and operator notes about the device. Although it may not be apparent at the time of configuration, an end user may nonetheless find such relationships useful, and even critical, for plant or process control operation, especially when utilizing an operator display or other HMI. Accordingly, the relationship schema and API, as described herein, may be published, and these relationships may be established or defined in spreadsheets (e.g., Microsoft Excel spreadsheets) and other mechanisms, and stored in additional databases.

Any of the relationships described herein may also be bi-directional (e.g., control algorithm to device, device to control algorithm). That is, as will be described further below, when the relationships are utilized for navigation in an HMI from a graphical element or display of one process control entity to a graphical element or display of another process control entity, the navigation may work in both directions (e.g., moving both up and down in a hierarchy, moving back and forth laterally, etc.).

Relationships may also exist by varying degrees of separation. For example, in a hierarchical relationship, there may be grandparent to grandchild relationships, great-grandparent to great-grandchild relationships, etc. In more lateral relationships, there may be "plus-one hop away" relationships, such as control module to field device to field device definition to diagnostic display.

Figure 3:
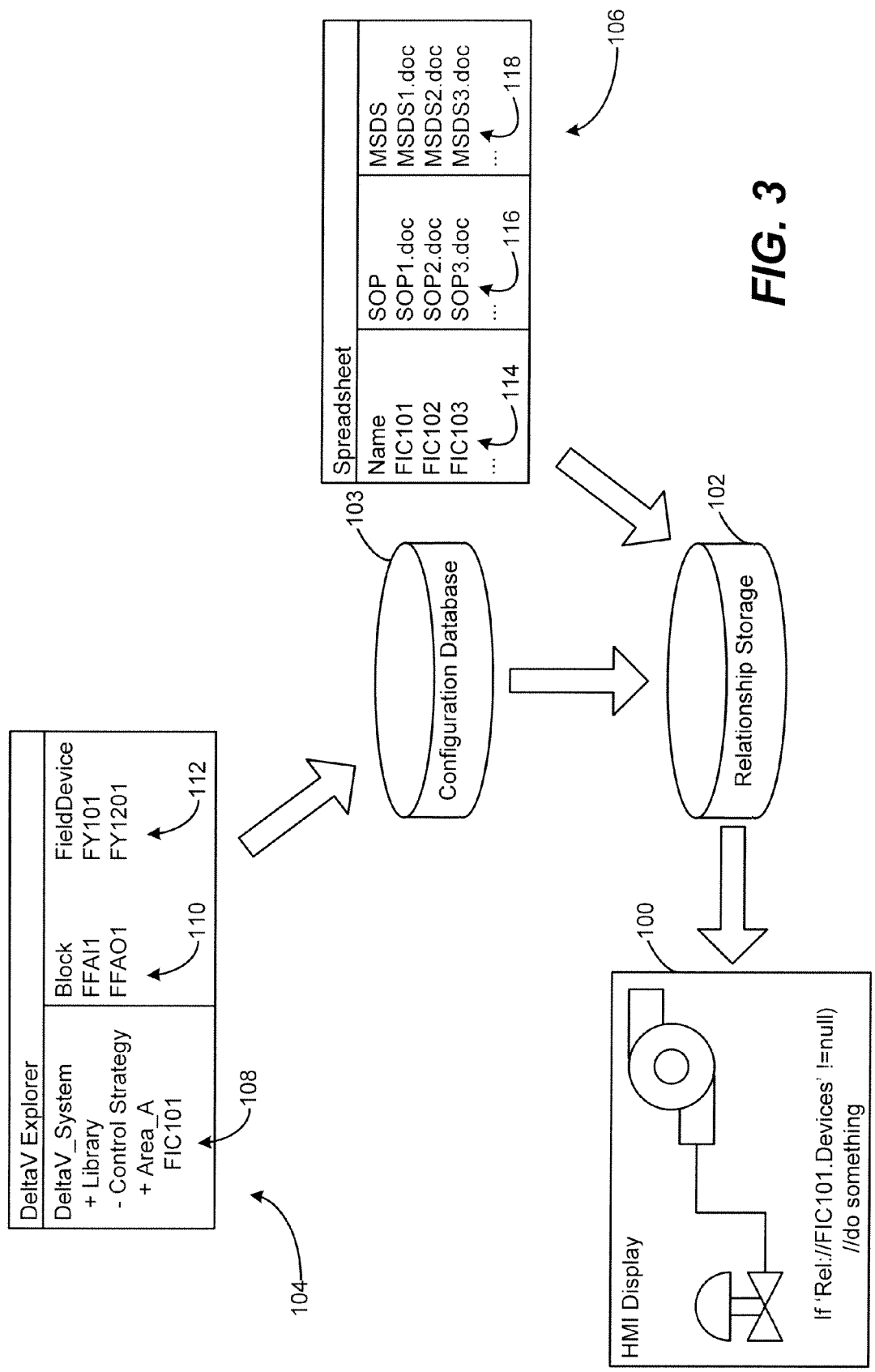
FIG. 3 is a logical diagram illustrating the configuration and publication of relationships between process control entities into a relationship store or library.

FIG. 3 generally illustrates a technique in which relationships (both configured and end user-defined) may be captured and made available to an HMI for navigation, such that a display may be generated based upon a unique process control tag associated with the correct graphical element or graphical display. More particularly, process control entities have unique process control tags, such as device names, control loops, etc. Whereas an operator display may be configured to show information about a specific process control tag or set of control tags (e.g., the operator display may be configured to shows set points, process variables, alarms, and other process results), these process control tags may also be utilized within the operator display by using relationships between the process control tags to establish navigational links within the operator display. That is, where the process control tags uniquely identify a process control entity (or at least uniquely identify the entity amongst the process control tags), the operator display is able to use relationships between the process control tags to drive navigation between graphical elements or displays, where the graphical elements or displays pertain to the process control entities that the tags represent.

Referring to FIG. 3, an HMI 100 extracts or otherwise receives a list of relationship value references from a relationship storage 102, where the relationship storage 102 is populated the relationships from various configuration databases by having the data pushed into it via publication steps (as indicated by the arrows) which take the data from the configuration databases and pushes the data to the relationship storage 102. The various configuration databases may include, for example, a process control configuration database 103 and various spreadsheets 106 (which may be end user specific) or other user-defined sources of relationship data as well as plant engineering databases, customer specific databases, or any other data source that may store relationship data. Much of the data for the process control configuration database 103 may be provided from the process control environment, like an editor 104 such as DeltaV™ Explorer, sold by Emerson Process Management. Alternatively, the data may be pushed to the relationship storage 102 from third party applications via the configuration database/spreadsheet 106. As such, the relationship storage 102 acts as a library of relationship value references as it is populated with the relationship value references based on the relationship data received from the various relationship data sources 103, 106. Relationships may be accessed by the HMI much like an object linking and embedding (OLE) for process control (OPC) data source which reads from the relationship storage 102.

The relationship storage 102 may function as a runtime or operations relationship store, and may be implemented in one or more memories and/or in one or more databases local to or remote from the workstation executing the HMI. In one example, the relationship storage 102 is implemented as a relationship data server extension (DSE) reference, which may be local to the workstation executing the HMI. The relationship DSE may, in turn, communicate with a relationship server that communicates with the respective relationship DSE's of several workstations. Further disclose of this example is provided below. However, in another example, the relationship storage may be implemented to service multiple workstations and multiple HMI's.

Generally speaking, a relationship value reference defines the relationship between logical and/or physical process control entities. Where the entities are attributed a process control tag uniquely identifying the entity, the relationship value reference defines the relationship between the entities based on the relationship between the process control tags. For example, a relationship value reference for a control module having process control tag FIC101 may reference a relationship with another entity, such as a field device having process control tag FY101. The relationship value reference may further define details about the relationship between the control module, FIC101, and the field device, FY101, such as the type of entity (e.g., control module), the type of related entity (e.g., field device), and the nature of the relationship (e.g., child).

Generally, the format of a relationship value reference may be provided as both data and metadata, an example of which is provided below:

Data:
Tag—Unique name of the process control entity
Tag Type—e.g., module, device, standard operating procedure
Related Tag Type—type of tag
Related Tag—Unique tag relationships
Metadata:
Tag Type
Type of relationship (e.g., child, parent, association)
Cardinality (zero-one, one, zero-many)
Related Tag Type The Tag data may be provided as an identification of the process control entity. As referenced above, the Tag data is generally a process control tag for a particular entity that uniquely identifies the process control entity within the scope of the process control tags. For example, a relationship value reference describing a relationship for a control module may use the control module's process control tag, FIC101. Process control tags may be provided prior to or during configuration for most entities, but may also be provided by an end user when defining additional relationships. For example, referring to FIG. 3, a user may define process control tags for various documents, such as standard operating procedure documents (e.g., SOP1.doc, SOP2.doc, etc.) and Materials Safety Data Sheet documents (e.g., MSDS1.doc, MSDS2.doc, etc.).

The Tag Type data and metadata generally refers to a definition of the type of object. For example, the tag type for FIC101 is "Module" and its description may be "Flow loop in Unit 1". As previously indicated, the process control entity may be a physical or logical process control entity, several examples which have been disclosed herein. Particular examples, as discussed further below, include modules, devices, control algorithms, standard operating procedure documents, MSDS documents, etc. Accordingly, the Tag Type may reference these descriptions as part of the relationship value reference.

The Related Tag data refers to the identification of the other process control entity involved in the relationship. In other words, the Related Tag data is the relationship value. For example, the Related Tag may be provided as a process control tag for the related entity that uniquely identifies the related process control entity within the scope of the process control tags. For example, when defining a relationship of a control module, FIC101, with a device, the Related Tag may utilize the process control tag of the device, FY101. As such, the relationship value reference identifies the entities involved in the relationship being defined. Although it is contemplated that a relationship value reference may refer to more than one relationship for a process control entity (e.g., relationships between module FIC101 and device FY101, module FIC101 and faceplate Loop_fp, module FIC101 and plant area AREA_A, etc.), the disclosure herein refers to each relationship separately, such that separate relationship value references are provided for each relationship, even if referring to multiple relationships for the same process control entity. For example, a relationship value reference may be provided for each relationship involving the control module FIC101. In a further example, a relationship value reference may be provided for multiple relationships between one entity and multiple entities, such as relationships between a module and several devices related to that module.

Similar to the Tag Type data and metadata, the Related Tag Type data and metadata generally refers to a description of the process control entity identified by the Related Tag data to which the process control entity identified by the Tag Type relates. That is, where the relationship value reference describes the relationship of a control module (having Tag "FIC101" and Tag Type "Control Module") with a device (having Related Tag "FY101"), the Related Tag Type describes the device (e.g., "Field Device"). As such, the Related Tag Type references the description of the related process control entity as part of the relationship value reference.

The Type of Relationship metadata refers to a description of the relationship between the process control entities. As previously disclosed, various types of relationships may be defined among physical and/or logical process control entities. These relationships may be hierarchical (e.g., child, parent) or lateral (e.g., previous/next in process), as well as bi-directional and of more than one degree of separation (e.g., control module "FIC101" to device "FY101" to MSDS document "MSDS1.doc"). In the examples disclosed here, the Type of Relationship refers to the relationship of the related process control entity as identified by the Related Tag as it pertains to the process control entity as identified by the Tag. For example, in a relationship value reference for a control module, FIC101, describing a relationship with a device, FY101, the device is a "child" to the control module. However, the Type of Relationship may also be defined in the reverse, such that in the above example, the Type of Relationship in the relationship value reference is stored as "parent".

The Cardinality refers to the number of entities associated with a given Tag, Tag Type and Related Tag Type combination. For example, FIC1/Module/Controller may have a cardinality of one (i.e., exactly one controller), whereas FIC/Module/Device may have a cardinality of two or more (i.e., the relationship may involve multiple devices). The Cardinality may be used to validate integrity of the relationship data in the relationship store and also provide an indication as to whether a single value or a vector of values will be returned.

Examples of the relationship value reference data, as well as the Type of Relationship, are provided below in the table below:

| Tag | Tag Type | Type | Related Tag Type | Related Tag |
|---|---|---|---|---|
| FIC101 | Control Module | Child | Field Device | FY101 |
| FIC101 | Control Module | Lateral | Faceplate | Loop_fp |
| FT103 | Field Device | Lateral | Diagnostic FP | AMS_Valve_fp |
| PT1304 | Field Device | Lateral | Diagnostic FP | AMS_Transmitter_fp |
| FIC101 | Control Module | Child | Block usage | FIC101/PID1 |

-continued

| Tag | Tag Type | Type | Related Tag Type | Related Tag |
|---|---|---|---|---|
| FIC101/ PID1 | Function Block | Lateral | Block definition | PID |
| PID | FB Definition | Lateral | Faceplate | pid_fb_fp |
| FIC101 | Control Module | Parent | PlantArea | AREA_A |

The first three fields of the data (Tag, Tag Type, Related Tag Type) make up a relationship key, and the fourth field of the data (Related Tag) is utilized as the relationship value. As previously explained, a process control entity may have many relationships with different process control entities. For example, the control module FIC101 may have relationships with faceplates (e.g., Loop_fp), function blocks (e.g., FIC101/PID1), areas (e. AREA_A), etc. In some instances, a process control entity may have more than one relationship with another process control entity. For example, a control module FIC101 may have multiple physical or logical links with a device FY101 (e.g., control, diagnostic), such that each link to that device (FY101) is a separate relationship (e.g., FY101-A, FY101-B). That is, there are multiple relationship values for a single relationship key. Alternatively, as noted above, a process control entity may have multiple relationships with multiple process control entities, such a module having relationships with multiple devices. Although it is expected that that the number of relationships for any one graphical display is a relatively small number (e.g., less than or equal to 10), it remains possible that a single relationship result may contain a vector of 100 or more values, such as with control modules in an Area. Accordingly, the Related Tag is utilized to uniquely identify each particular relationship between the process control entity (e.g., FIC101) and another process control entity (e.g., FY101). Examples of relationship keys and relationship values are provided in the table, where FIC101 is a control module tag, FY101-A and FY101-B are field device tags and Loop_fp is a faceplate display tag:

| Relationship Key (Tag.TagType.RelatedTagType) | Relationship Value |
|---|---|
| FIC101.ControlModule.Device | FY101-A |
| FIC101.ControlModule.Device | FY101-B |
| FIC101.Faceplate | Loop_fp |
| FY101-A.ControlModule | FIC101 |
| FY101-B.ControlModule | FIC101 |

The values are generally strings or represented as strings in the relationship storage 102. That is, the relationships are represented as string results and single value (or a vector of values) accessed together. Referring again to FIG. 3, it can be seen that the relationship sources, such as the process control configuration database 103 and end-user defined spreadsheets 106, contain data regarding these relationships. Each database may include data regarding various entities within the process control system or process plant, and data regarding additional entities related to that entity. For example, the process control configuration database 103 includes data regarding the control module 108, as well as a list of process control entities related to that control module, such as blocks 110 and devices 112. Similarly, the spreadsheets 106 includes data regarding the control modules 114, as well as a list of process control entities related to each module, such as SOP documents 116 and MSDS documents 118. As seen in FIG. 3, each of the process control entities is identified according to its associated process control tag.

Figure 4:
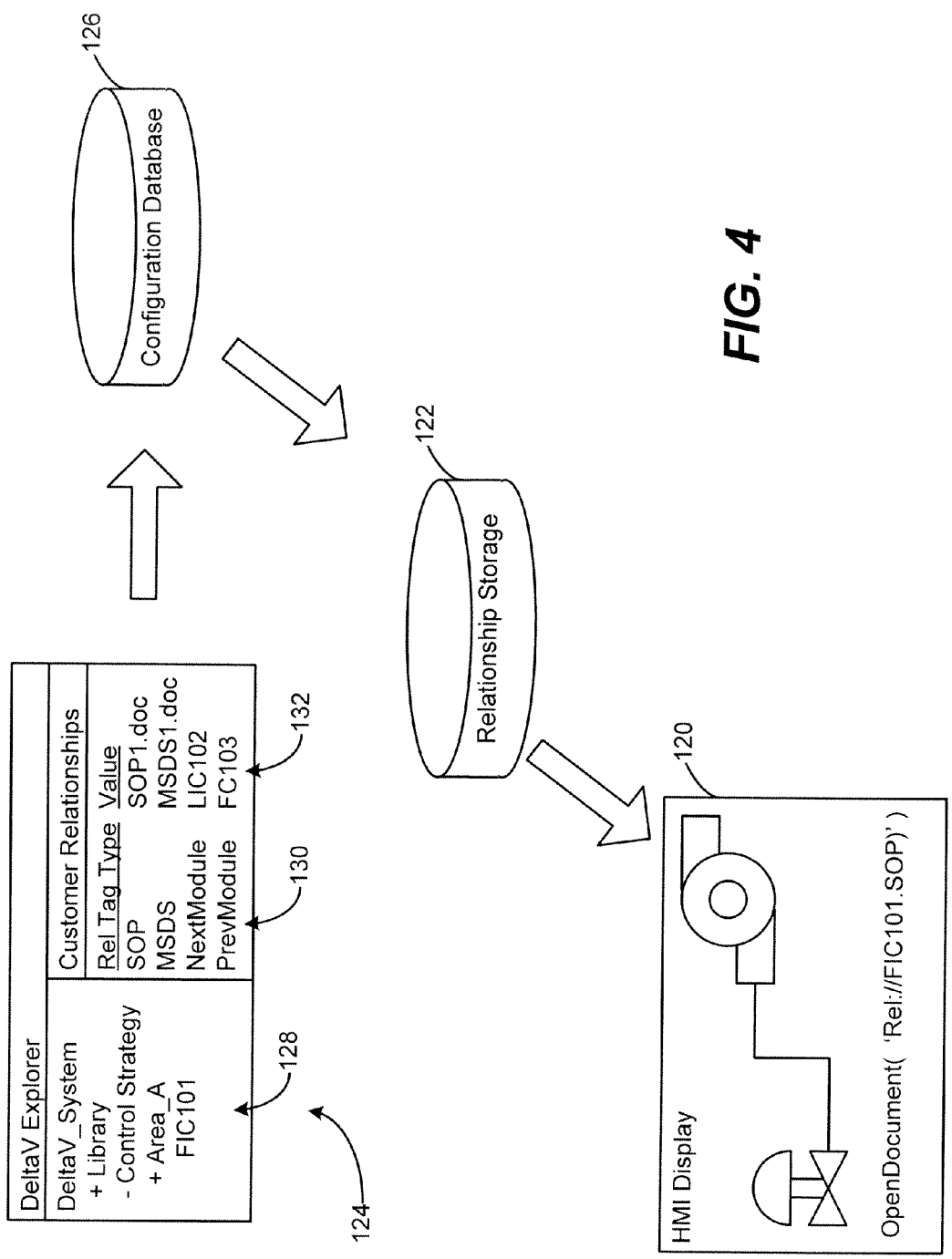
FIG. 4 is a logical diagram illustrating an alternative configuration and publication of relationships between process control entities into a relationship store or library.

FIG. 4 generally illustrates an additional, or, in some cases, alternative, manner in which a place to configure the relationships may be provided, thereby enabling a user to define additional relationships when configuring the control strategy. This technique may be utilized to avoid using spreadsheets to manage the relationships, as discussed above with reference to FIG. 3. In particular, during configuration of the control strategy by an end user, there may be additional relationships that should be, or need to be, defined beyond those established during configuration of the operator system, the process plant or the process control system. Generally speaking, the process control system configuration may be extended to allow additional relationships to be defined by an end user using, for example, a process control environment such as DeltaV™ Explorer, sold by Emerson Process Management.

Referring to FIG. 4, an HMI 120 and a relationship storage 122 are again provided similar to that described with reference to FIG. 3. In addition, a process control environment 124 may be utilized for the end user defined relationships, which may push data into and populate the relationship storage 122 and stored as part of the configuration in a configuration database 126 (in this example, depicted separately from the process control environment 124 for illustration only). In one example, a configuration service may be used to pull data from the configuration database 126 and push the data into the relationship storage 122. By extending the process control configuration to include end user defined relationships, an end user may be enabled to establish navigation links to process control entities not originally included in the original configurations. In keeping with the description of relationship data described above, a user may define relationships to associated standard operating procedure (SOP) documents or MSDS documents, as shown in FIG. 4. That is, the user may be enabled to define new relationships specific to the end user, and that were not originally contemplated during process plant configuration or operator display configuration. For example, the end user may define relationships between a control module 128 and SOP documents, MSDS documents, next module in a process and previous module in a process. Each of these related process control entities are identified according to Related Tag Type 130 and Related Tag which corresponds to the relationship value 132. Further, while navigation is a major use of the relationship data, it is also useful to list the relationships on a display. For example, on a module faceplate, a list of devices that interact with the module may be displayed, where the list may include details about the device(s), such as device status and hyperlinks to a faceplate of the device.

Figure 5:
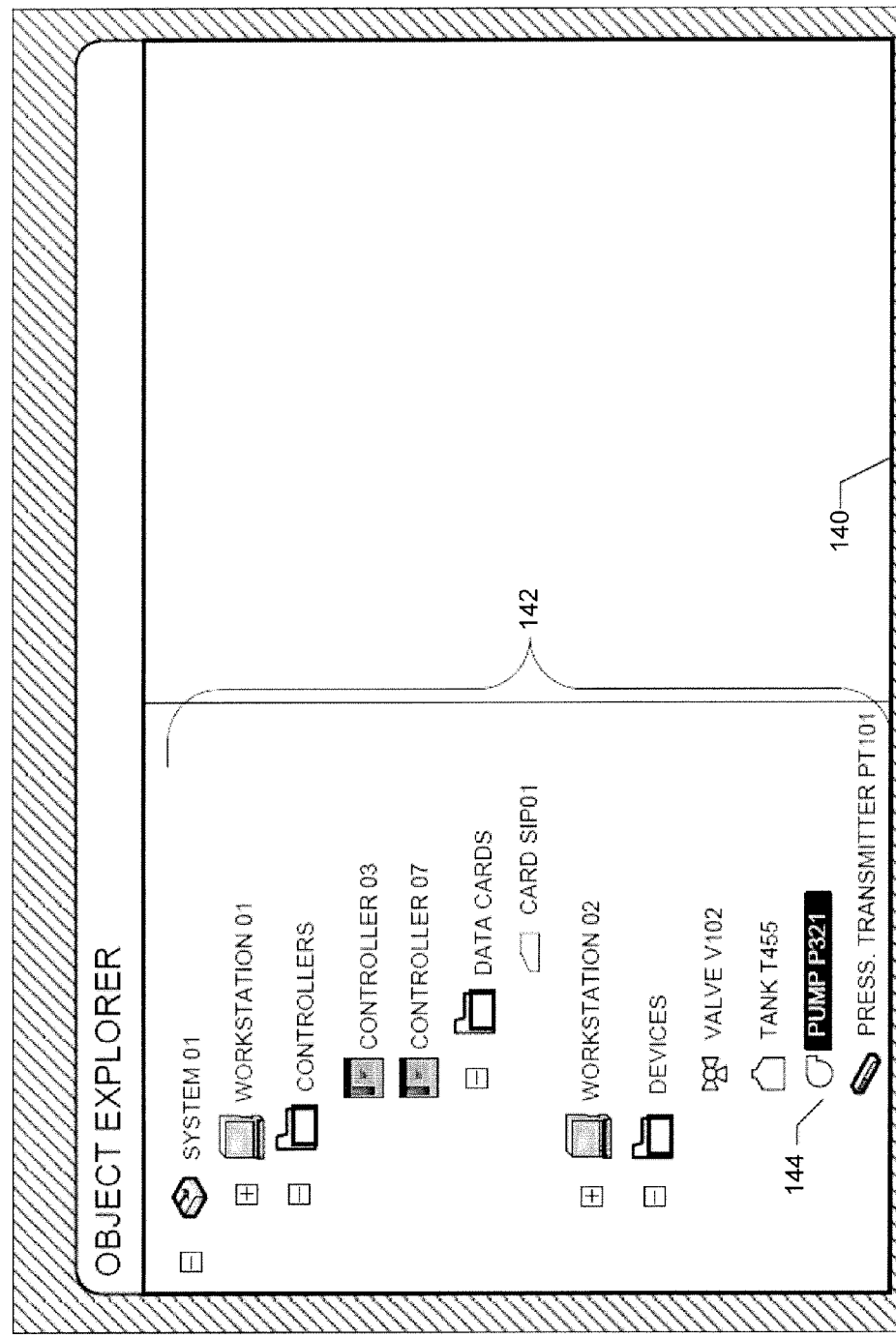
FIG. 5 is a graphical display illustrating a process control explorer image and a process control graphic image which may be utilized for displaying the relationships of a process control entity.

FIG. 5 illustrates an example process control environment 124 including a display containing a process control explorer image 140. The process control explorer image 140, named OBJECT EXPLORER, may be a graphical user interface, application window, etc. The process control explorer image 140 displays process control entities 142 organized in a hierarchical structure. These process control entities 142 may include, but is not limited to, any of those logical and/or physical process control entities described herein. For example, the process control entities 142 may include one or more process control systems, workstations, controllers, data cards, equipment, field devices, SOP documents, MSDS documents, etc. The process control explorer image 140 enables the end user to organize and/or browse entities within a process control system, including the relationships therebetween, with the relationships for a selected process control entity being displayed in the pane to the right. In this example, a process control SYSTEM 01 includes WORKSTATION 01, WORKSTATION 02, a CONTROLLERS folder, and a DEVICES folder. The WORKSTATION 01 and/or WORKSTATION 02 may include SOP and/or MSDS documents. The CONTROLLERS folder includes CONTROLLER 03, CONTROLLER 07, and data card CARD SIP01. The DEVICES folder includes process control equipment including a VALVE V102, a TANK T455, and a PUMP P321 1912. In addition, the DEVICES folder includes a PRESS. TRANSMITTER PT101. The PUMP P321 144 may correspond to the pump 112 of FIG. 1, the CONTROLLER 03 may correspond to the controller 106, the WORKSTATION 01 may correspond to the workstation 102, and the PRESS. TRANSMITTER PT101 may correspond to the field device 110a. A user may click into and/or open any of entities to view and/or edit configuration information, data source information, address information, setup information, relationship information, etc. Further disclosure of a process control environment may be found in U.S. patent application Ser. No. 12/055,896 entitled "Methods and Apparatus to Create Process Control Graphics Based on Process Control Algorithm Information" as filed on Mar. 26, 2008, the contents of which are incorporated by reference herein.

Figure 6:
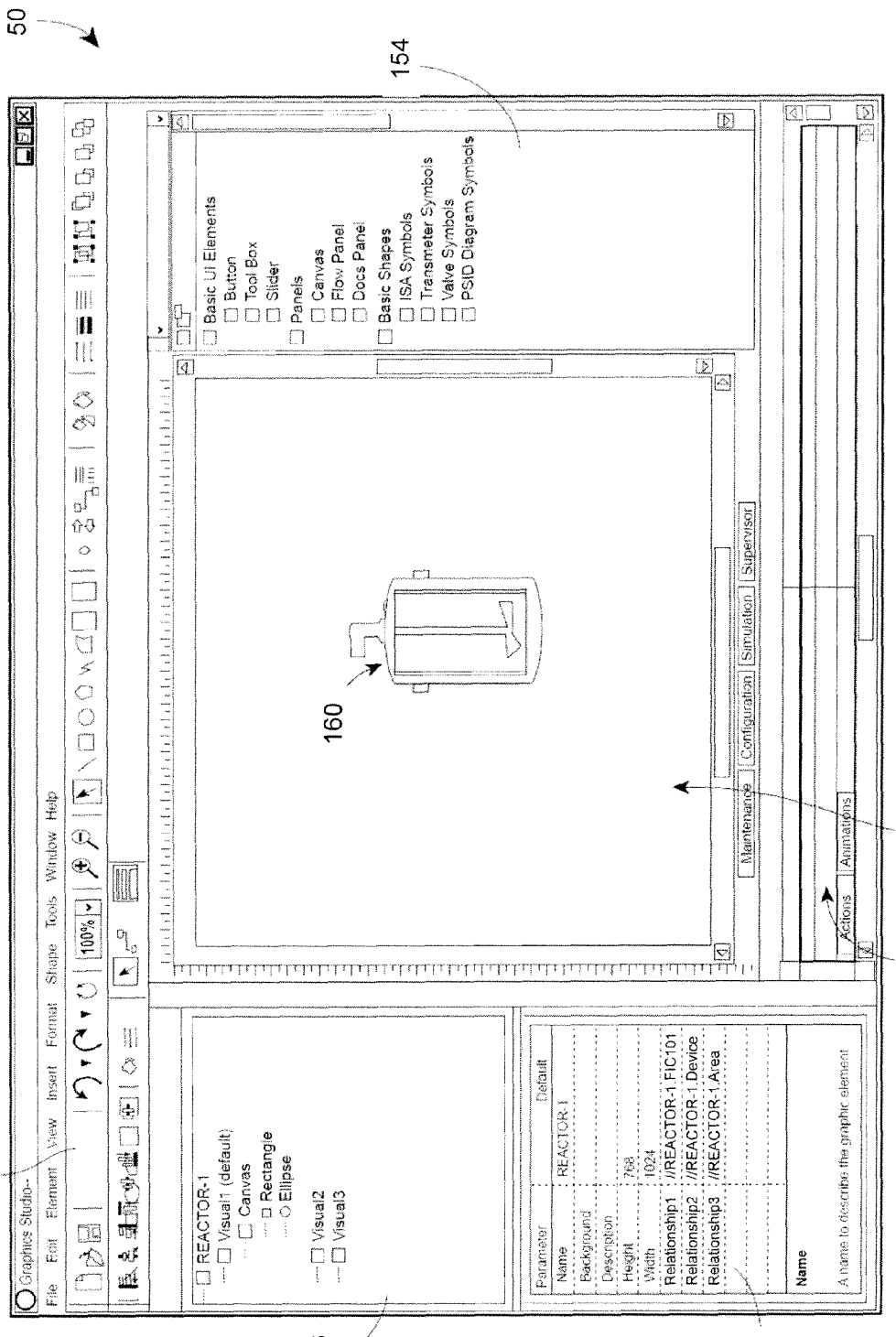
FIG. 6 is a display screen produced by a graphical editor showing a manner in which relationships may be defined for a graphical element or graphical display at configuration time.

FIG. 6 illustrates an example screen display of a graphic editor 50 that may be used to create or modify one or more relationships of a process control entity to control the behavior of navigation during runtime of the HMI. The graphic editor 50 may be used by a system designer during process control system configuration, or during operator display configuration. However, the graphic editor 50 may also be made available to an end user during, for example, control strategy configuration or other configuration environments.

The editor 50, which is depicted in the process of creating a tank that may eventually be used in a graphic display depicting, for example, a reactor portion of a process plant, includes a main edit section 152, a pallet view 154, an element hierarchy section 156, and a parameter definition section 158. The main edit section 152 provides a working space for the user or designer to define or create a composite shape 160 and thus to define the visual properties of the composite shape, in this case a tank, and also to arrange and configure the composite shapes into graphical displays, such as a reactor. Generally speaking, the composite shape 160 created by the element editor 50 may be made up of one or more sub-elements 162 or various shapes that are placed or grouped together in a defined manner. The sub-elements may also be composite shapes such that a single composite shape may include one or more "nested" composite shapes as sub-elements. For example, composite shapes may include circles, lines, points, polygons, squares, rectangles, triangles, or other graphic shapes as sub-elements. The tank composite shape 160 of the reactor graphic display depicted in FIG. 6 is one example of a composite shape as it includes multiple sub-elements 162. One or more of the sub-elements may be a composite shape, for example, an "Agitator" sub-element of a "Tank" composite shape may be made up of several sub-elements. When defined in this manner, separate actions or animations may also be applied to or associated with each of the different shapes making up a composite shape 160. Of course, composite shapes may include more elaborate artistic renditions of elements. To define or build up a composite shape, a user or designer may add any number of sub-elements or other composite shapes to the main edit section 152 and group these together in any desired manner. Further disclosure of composition shapes and techniques for creating and scaling composite shapes may be found in U.S. patent application Ser. No. 12/403,812 entitled "Scaling Composite Shapes for a Graphical Human-Machine Interface" as filed on Mar. 13, 2009, the contents of which are incorporated by reference herein.

The composite shapes may include a number of parameters that may be defined during configuration time (i.e., creation of the composite shape) that are depicted in FIG. 6. In some embodiments, the parameters may be related to scaling behaviors of the composite shapes, as shown in the parameter definition section 158. It is in the parameter definition section 158, for example, that the parameters for the composite shape (in this case a tank) may be configured to read a piece of relationship data. For example, the parameter definition section 158 may list process control tags with which the tank has a relationship as configured by a user, such as process control elements within the reactor, of which the tank is apart. The process control tags may thus be used to establish navigational links to the process control entities identified by the process control tags, thereby driving the HMI to render links to graphical elements and graphical displays representative of those related process control entities.

Once created, composite shapes define the graphical representation for an actual object, which may be implemented in the runtime as an PGXML, XAML, or Windows Presentation Foundation (WPF—formerly named "Avalon" controls, which are well known controls provided by Microsoft® and which, because they are object based, are easily implemented in standard Windows® type displays and portable between display environments. These objects may be displayed on a screen or display when the composite shape is used in a runtime environment. The shapes or sub-elements 162 making up the composite shape may be illustrated in a composite shape hierarchy in the hierarchy section 156. In the configuration time environment illustrated in FIG. 6, a user may associate and define various parameters, as described below, with each sub-element of the composite shape.

In the editor 50, the pallet view 154 includes a number of basic elements that can be used to create a composite shape 160. For example, the pallet view 154 includes a set of basic UI (user interface) elements, such as buttons, text boxes, sliders, knobs, etc., a set of basic panels, and a set of basic shapes. The defined panels may provide a container for various sub-elements and may impart one or more configuration or runtime behaviors to the contained sub-elements. For example, the various panels may include a scaling canvas panel 164 that includes the functions of the canvas panel with the additional function of being able to resize a composite shape 160 without distortion of it sub-elements. A composite shape 160 may be selected from the pallet view 154 and dragged to the edit section 152. Still further, the sub-elements and composite shapes in the pallet view 154 may include ISA (Instrument Society of America) symbols, transmitter symbols, valve symbols, PI&D diagram symbols or other control symbols, etc. or any other desired shapes, all of which can be used to build a composite shape.

The element hierarchy section 156 provides, using a hierarchical view or a tree structure, the components associated with the shape 160 within the main edit section 152. In the example of FIG. 6, the hierarchy section 156 shows that the composite shape 160 being defined in the main edit section 152 includes sub-elements or primitives 162 of a Rectangle and an Ellipse and well as a sub-element that is a composite shape of an Agitator, and its ellipse and rectangle sub-elements Of course, the sub-elements depicted in the hierarchy section 156 are for illustration purposes only as the shape 160 illustrated in FIG. 6 includes more sub-elements than shown. While not shown in FIG. 6, the hierarchy section 156 may include indications of animations, actions and other display features, such as scripts, visual triggers, etc. defined for the shape 160.

The parameter definition section 158, illustrates all of the parameters, including intrinsic parameters, currently defined for the composite shape 160 shown in the editor 50. During configuration, if the Reactor is selected, the parameter definition section lists the process control entities with which the Reactor has a relationship. More specifically, the parameter definition section 158 may list the path syntax for the reference key, or alternatively the reference value, thereby associating the graphical element or display with the relationship value reference. Even more specifically, the graphical element or display is stored and identified by a unique graphical element identification, which is associated with the appropriate relationship value references as defined in the parameter definition section 158.

As described further below, a relationship DSE may interface with the relationship parameters that are configured from the definition section 158. The configured relationship parameters and logic of the relationship DSE may permit generation of relationships in the HMI in both a configuration environment and a runtime environment. For example, at configuration time when a user is creating the various composite shapes 160 to be stored in a composite shape library, or creating a graphic display including one or more composite shapes, the user may configure which relationships to use so that the process control entity as represented by the composite shape is understood to be related to another process control entity, as may be represented another composite shape or other graphical element or display. Also, when user opens and uses a operator display at runtime, the user or operator navigate from one graphical element or display to another based on the relationships.

Once the relationship parameters are stored and set at configuration time, the configured graphical element or composite shape may be stored in a composite shape library for use at configuration time when configuring the HMI, and at runtime within an HMI. It should be noted that defining the relationships according to the relationship parameters for a graphical element or display does not mean the relationships, much less the navigational links created therefrom, are hard coded into the HMI. To the contrary, the utilization of relationship parameters is to associate the graphical element or display (as identified by a graphical element identification) with other graphical elements or displays (as also identified by graphical element identifications) during runtime of the HMI, during which the relationship value references from the relationship storage are associated with and bound to the graphical elements/displays. As such, navigation in the HMI may remain partially, primarily or entirely data driven.

Figure 7:
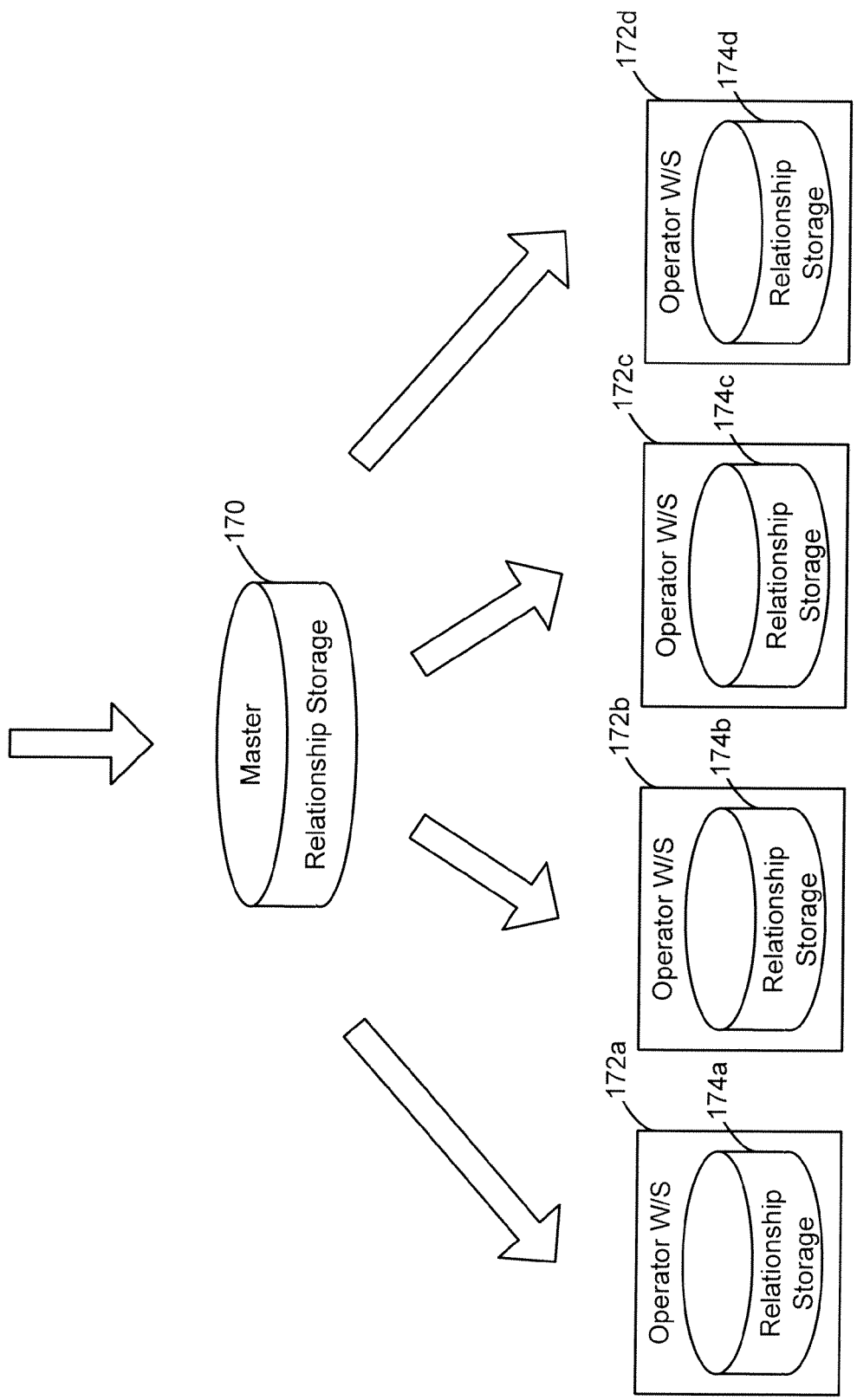
FIG. 7 is a logical diagram illustrating replication of the relationships to the workstations.

In addition to populating the relationship storage with relationship data to drive the HMI, the runtime performance of the HMI may be further enhanced by replicating the relationship data on each operator workstation. Generally speaking, this allows the data to be highly available to the operator workstation without being dependent on another workstation, a central workstation or a server at runtime. Referring to FIG. 7, a master relationship storage 170 may be populated with relationship value references based on relationship data retrieved from the various relationship sources, as has been described above. As such, the master relationship storage 170 may act as a central or master library for the relationship value references. Periodically, the relationship value references may be distributed and replicated to a local relationship storage 174a-174d for each workstation 172a-172d, respectively. This may be accomplished in any of a number of ways, including periodic or application driven requests from the local relationship storage 174, or periodic data pushes from the master relationship storage 170.

Further, the relationship value references replicated on the local relationship store 174 may depend on the function or user of the workstation. For example, replication may be limited to those relationship value references within the user's or workstation's span of control. That is, only those relationships involving process control entities under the user's or workstation's control may be replicated to the associated relationship data store. Process control entities and relationships thereof not within the user's or workstations realm of control may not be replicated. In another example, replication may be limited to those relationship value references within the user's or workstation's span of interest. That is, relationships that may be outside of the user's or workstation's span of control, but are nonetheless of interest or useful to the user or workstation. Examples may include alarms within an area, when the span of control is limited to a particular unit in the area, or maintenance activities when the span of control is limited to operations. In still another example, replication may extend to all relationships in a process control system or process plant.

By replicating the relationship value references to the local relationship storage of each workstations, the workstations do not depend upon the availability and performance of a central workstation or server. Additionally, because these relationships are both local and static, access to external documents, such as SOP or MSDS, do not depend upon communications with a controller. In the event of a communication failure with the controller, the operator may still access the SOP document name and even the SOP documents itself (if the network is available or if the document is locally cached), which may have instructions on how to proceed when communications has been lost.

Once the relationship data from the relationship sources has been used to populate the relationship storage with relationship value references, and once the graphical elements and displays have been configured, during runtime the HMI may access the relationship data from the relationship storage using similar syntax to access runtime data. In one example, these relationships are accessed via the relationship DSE as part of a path. An example of path syntax is provided in the following table:

| Path Syntax | Description |
| --- | --- |
| //FIC101.Device[0] | Get first (primary) device |
| //FIC101.Device | Get all devices related to this control module |
| //FIC101.Faceplate | Get faceplate for FIC-101 |

Within the HMI 100, the relationship data may be used to drive navigation between graphical elements and graphical displays, thereby controlling what is displayed. That is, the HMI may be data driven using the relationships, because the relationships are deterministic when the system is operational and generally no configuration changes are made during operation. The graphical elements and displays are added to the operator display at runtime by determining the relationships. As a result, the relationship data source 103, 106 and relationship storage 102 will return the result (or results) for the same tag and type, such that a consistent user experience may be created on the HMI. For example, clicking on a button on a faceplate of the HMI for a given process control tag results in the same action every time. As such, navigation and display in the HMI 100 is at least partially data driven, as opposed to hard coding the links in the HMI and/or accessing the necessary modules during runtime, which in some cases may impact control performance (e.g., by coupling the navigation to the controller or to runtime).

Generally, the relationship data, and particularly the relationship values, may be used to dynamically create the navigational links by reusing a common display for several parts of the process control system, such as using the same display for many modules as opposed to creating a new display for each module. For example, if a graphical display for a control module is associated with a piece of equipment, such as a field device, the display may illustrate this. If the field device utilizes its own display (e.g., faceplate), the HMI 100 may invoke a script to open the related faceplate. Using this example, a graphical display that includes a graphical element depicting a field device along with a related graphical element depicting a relationship between that field device and another process control entity, such as the faceplate, is driven by the relationship data to navigate from the field device to the faceplate of the field device in the HMI. It is further possible to display process information about the related field devices such as status mode or alerts, where the status mode or alerts. Because the HMI 100 is able to access the relationship data from the relationship storage 102, it is not necessary for the HMI 100 to retrieve the specific relationship data from the specific process control system runtime. Thus, the relationship data may be made readily accessible, even in the event access to the process control system is not available.

The relationships between process control entities may also be graphically represented in the HMI 100. For example, a graphical display or graphical element for a process control entity may be configured to display an additional graphical element, or sub-element to the graphical element, (e.g., a button) that enables a user to navigate to a graphical display or graphical element of a related process control entity. Further, the HMI 100 may present the user with additional options, toolbars, etc. These relationships may be utilized to allow alternate options to be presented on a graphical display, such as additional menu items (context menu and application) as well as toolbar items, and may be utilized to allow alternate information to be presented, such as a list of control parameters of function blocks showing current process values in the process plant. The alternate options and information may be data driven by the relationship data in much the same way as the graphical elements and graphical displays. For example, the display can use the relationships to create a list of devices used by a module. The module name can be provided at runtime, and the list will vary based upon the module name, in that the list of related devices may vary from module to module. A further example is a list of devices that interact with a particular controller. Once the list is provided/generated, process data (e.g., device health) may be read from the runtime and that information may be displayed. This avoids creating a new, unique display for each module, or a new, unique display for each controller. These types of display techniques (e.g., using a common display for multiple entities) may be accomplished using scripting, for example.

Further explanation as to how the relationship data, or, more specifically, the relationship value references, drives the HMI 100 is now described with reference to FIG. 8. Specifically, in order to utilize the relationships during runtime to drive the HMI, a relationship data server extension (DSE) 180 is provided as a mechanism for using the relationships between various process control tags to allow alternate information to be presented on a display, navigate between displays, present additional menu items, toolbar items and otherwise drive the HMI navigation and display.

Generally speaking, the relationship DSE 180 may be local to each workstation, such that the relationship DSE operates within an operator environment and communicates with a relationship server 182 in a runtime environment. The relationship server 182 may act as a relationship storage or master relationship storage, or otherwise provide access to the same. The relationship DSE 180 and relationship server 180 may communicate via communication protocol of an API, such as a Windows Communication Foundation (WCF) interface 184, which may enable support of a consistent remote client and web strategy. This may be a published interface (or group of interfaces) provided by the relationship DSE in order to provide the relationship value references to the operator environment.

The relationship DSE 180 is generally comprised of two parts: an assembly running in the context of the operator environment process, and another assembly or process running in the context of a service providing access to the underlying relationships. Using the WCF interface 184 between the user session process and the server process may allow for both processes Co reside on the same or different computers.

Figure 8:
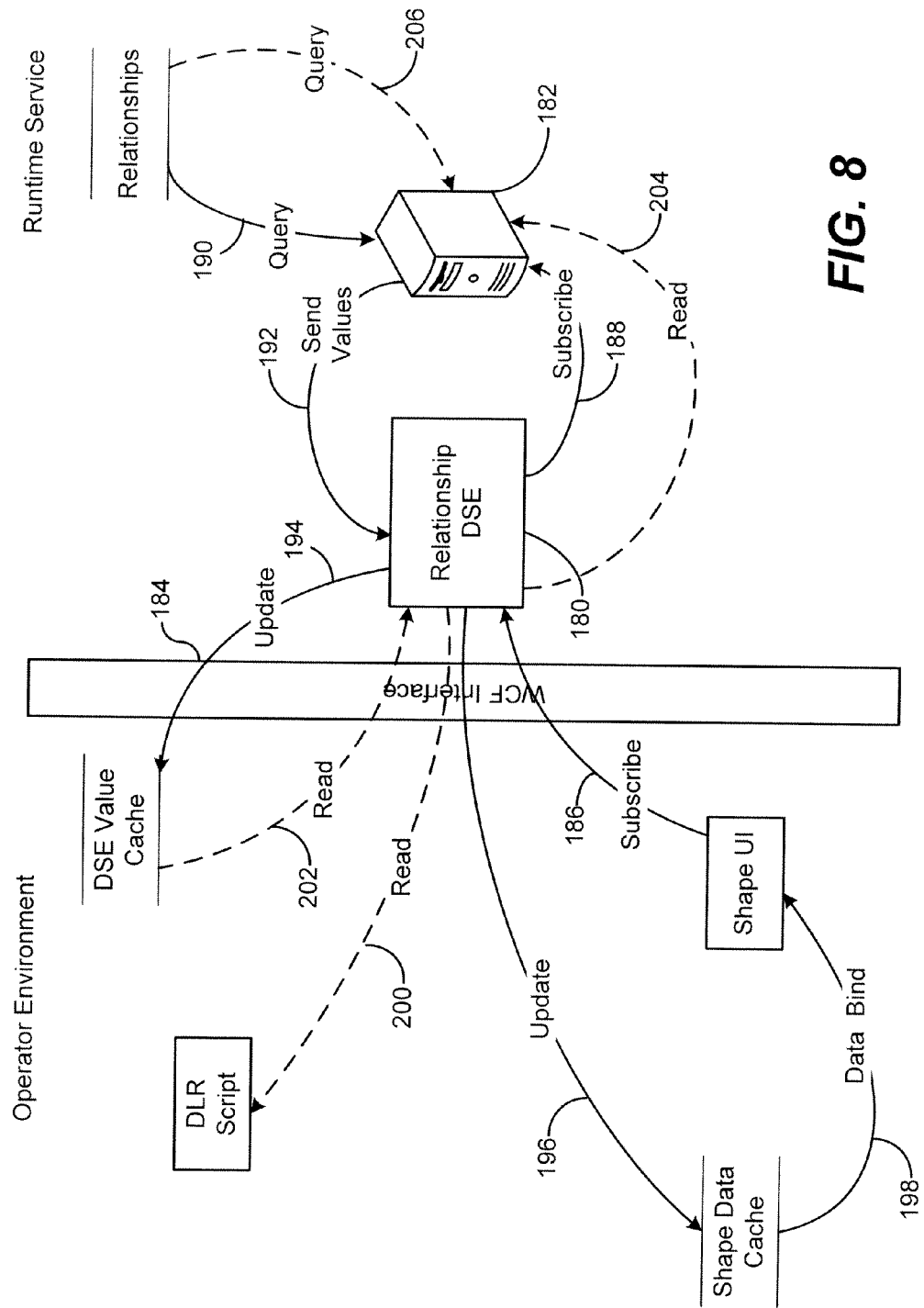
FIG. 8 is a data flow diagram illustrating the flow of relationship value references up to a graphical element or display.

FIG. 8 is essentially a macro level data flow diagram illustrates the flow of relationship value references up to a graphic element or display, and provide a general overview of the functionality provided by the relationship DSE. That is, the diagram illustrates the general flow, but should not be taken to represent threads or processes. The data flow pattern generally follows other existing patterns for values read and subscribe. However, in general the relationship value references read and subscribed to are local to the workstation.

When the HMI is first loaded, or when an operator environment display of the HMI is first loaded, the relationship DSE 180 may receive a list of the relationship value references and associated graphic element identifications from the relationship server 182 via the WCF interface 184. Each of these relationship value references may be represented in a string providing sufficient detail to locate a single relationship value. As previously discussed, the relationships value references are generally provided as key/value(s) pairs. The values are generally strings or represented as strings in the relationship server 182. The relationship DSE 180 binds or links to each of these values from the relationship server 182.

Referring now to FIG. 8, a shape user interface, such as the graphic editor 50, subscribes 186 to the relationship DSE 180 to receive the relationship value references, or at least have the relationship value references published to a shape data cache. In turn, the relationship DSE 180 may subscribe 188 to the relationship server 182 or other relationship storage to receive the relationship value references. The relationship server 182 queries 190 a relationship storage to retrieve the relationship value references. In another example, the relationship server 182 may query the relationship sources to retrieve the relationship data and form the relationship key/values therefrom.

The relationship value references are returned 192 to the relationship DSE 180. The relationship DSE 180 may cache the relationship value references by updating 194 a DSE cache for quicker or more efficient retrieval of the relationship value references. The relationship DSE 180 further updates 196 the graphic editor cache with the relationship value references. Thereafter, the relationship value references are bound 198 with the graphical element identifications of the graphical elements/displays.

The bindings 198, which may be static or fixed bindings, define the manner in which the parameters or properties of a graphical element/display are to be bound to the relationship value references, and, more particularly, with the relationship keys, within the runtime environment when the graphical element/display is implemented as part of a display in the runtime environment. Generally, the bindings 198 for each graphical element/display establish the manner in which the graphical element/display is tied to one or more entities or data elements defined elsewhere in the plant environment, and thus define an interface between the runtime environment and the graphical element and define navigation within the operator environment.

Once created, the graphical element and the graphic displays may be bound to and executed in the runtime environment on, for example, any of the workstations 20-23 of FIG. 1. In particular, after a graphical element or a graphic display is created as a class object and is stored in a database 52 or cache (see FIG. 8), that element or display may be instantiated as an actual runtime object and may be executed in the runtime environment. For example, the relationship DSE may instantiate an object as a Dynamic Language Runtime (DLR) script 200. The instantiation process fills in the bindings defined in the objects, which may be accomplished using one or more resolution tables that may be loaded with proper relationship value values by reading 202 the DSE value cache, within the process plant or process control system to provide a specific connection between process control entities within the process plant and within the graphic objects running on a display device within the plant 10.

A graphical element, or a graphic display may be copied or instantiated, and loaded onto the runtime machine to be ported to the runtime environment. In one example, the display object may be bound to the runtime environment only when called up or actually executed on a runtime machine, which is referred to herein as runtime binding. That is, the resolution table for each of the instantiated objects is only filled in or bound to the runtime environment when the display object is actually running or being executed in a runtime computer. Thus, the display object is may be bound to the runtime environment when that object is actually running on a runtime computer, which means that the display objects may be intermittently connected to the runtime environment in a manner defined by the activities of the users viewing the display created by these objects. In particular, these objects may be bound to a runtime environment at the times at which they are required to be viewed, and may be unbound or released when not being viewed by a user, such as when a user minimizes or closes a screen in which these objects are providing a display.

The display objects may thus be objects which may be created in a stand-alone environment, i.e., the configuration environment, but which may be tied or connected with other objects or data structures defined within the process plant environment or any application running within the process plant environment, including, for example, objects, data structures, applications, etc. defined in any control, simulation, maintenance, or configuration environment. Furthermore, once created, the display objects may be bound to physical or logical process entities directly, via the relationship value references defined in a resolution table. As needed, the relationship DSE 180 may read 204 relationship value references from the relationship server 182 during runtime, which, in turn, queries 206 for the relationship value references in response to the read requests.

Although several types and examples of relationships have been described herein, different relationships may have different criticalities or importance. As such, priority may be given to these critical relationships by the relationship DSE and relationship server. Examples of critical relationships may include:

- Module to Display of a given type
- Module to faceplate display
- Module to detail display
- Module to primary control display
- Module to user defined display
- Equipment Parent of Equipment and Control Modules, Unit Module, Process Cell, Area or Recipe
- Extension parameters to container (module, display or block)
- Next/Previous relationships (by process flow)
- Module to Next/Previous Module (both equipment and control)
- Unit Module to Next/Previous Unit Module
- Process Cell to next/previous Process Cell
- Area to next/previous Area
- Parent or containing item (example, module to unit module)
- Navigate to first child (by process flow)
- Area to First Cell
- Unit Module to first Equipment Module
- Equipment Module to first Control Module
- Module/Block/Parameter path to parameter type
- Display hierarchy and order of displays
- Up Display
- Next/Previous Display
- Areas within a user's span of control Additional relationships which may be less critical, but nonetheless important (i.e., fast relationships) may include:

- Module to Device(s) and reverse
- Devices to Module(s)
- Zones related to this System
- Equipment within an Area
- Process cells, unit modules, equipment and control modules
- Equipment within a Process Cell
- Unit modules, equipment and control modules
- Equipment within a Unit Module
- Equipment and Control Modules
- Equipment within a Module
- Control Modules
- Blocks within a Module or composite (browsing and APC and Diagnostic views)
- List of Blocks
- Steps within a Module or composite
- Transitions within a Module or composite
- Actions within a Step
- Parameters within a Block
- Historical parameters
- Not sure how to handle extensible parameters
- Fields on a parameter
- User defined relationships
- It should be possible for the user to create their own relationships
- Actions that can be performed on a Tag (Stroke Valve)
- Workstation Batch Executive to Assigned Recipes and reverse
- Workstation Batch Executive to Assigned Areas For documents and faceplates (displays), important or fast relationships may include the following:

- To SOP and MSDS document names
- Module to document name
- Unit module to document name
- Area to Document name
- Process Cell document name
- Device to Document name
- Recipe to Document name
- Module to Algorithm Information
- Device to a Device Type
- Device to Device Revision, Device Description or Device Type Icon
- Device Type and Device Revision to Device Faceplate Display or Device Detail Display
- Hardware to display
- Controller to Faceplate Display
- Card to Faceplate Display
- Subsystems on a Node
- Nodes on a System
- Workstations, Controllers, Switches, Remote IO, etc.
- Controller to Cards
- Cards to Channels
- Parameters on hardware such as node, card, channel, port, etc.
- Devices on a Fieldbus Port
- Devices on a Hart Channel
- Asibus and Profibus
- Modules to referenced DSTs and reverse Additional examples of relationships may include:

- Equipment within an equipment and reverse
- Modules to referenced DSTs and reverse
- Cards and DST and reverse
- DST to channels and reverse
- Controllers to Cards and reverse
- Cards to Devices and reverse
- Modules to Devices and reverse
- Workstation Batch Executive to Assigned Recipes and reverse
- Workstation Batch Executive to Assigned Areas
- Process flow of by modules at level 3 and level 4 displays
- Navigation blocks within a module based upon execution order
- Navigation of steps within a module based upon step execution order
- Navigate into a Module's blocks/steps/transitions and reverse
- Navigate to the important blocks within a module
- List all recipes and navigate up/down the recipe hierarchy including into the phase class
- Navigate from the module to the controller displays and reverse
- Navigate from a module to the cards it accesses and reverse
- Navigate form a module to the controller assigned and reverse
- Navigate from an area to the modules within the area
- Navigate to the next/previous controller, card, workstation
- Navigate from the card to the containing controller and reverse
- Controllers (and nodes) to alarm area and reverse
- Workstations alarms event subsystem to Areas and reverse
- Workstation Continuous Historian to Areas and reverse
- Virtual Logic Solver to Node
- Device to shadow block and reverse
- Device to port/card/controller and reverse
- Logical solve to the hosting node and reverse
- Parameters on Blocks definitions
- Parameter to name set
- Parameter to fields
- Module to equipment arbitration
- Card to remote IO subsystem
- Any instance or usage to the definition such as FIC-101/PID1 to PID.

Unit class to phase class, Unit modules to phase classes and revere
Remote IO to Scanner and reverse
Remote IO to Card and reverse
Remote w/s to w/s
Remote IO Card to Controller's logical card and reverse
SIS Logic solver to logic solver cards
SIS Logic solver to channels and DST and reverse
SIS Modules to DSTs and reverse When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for navigation in an operator display in a process control system for use in a process plant, the method comprising:
    receiving a list of relationship value references and process control graphical element identifications associated with each relationship value reference, wherein each process control graphical element identification uniquely identifies a process control graphical element of the operator display, wherein each process control graphical element graphically illustrates an entity within the process plant, and wherein each relationship value reference uniquely identifies a logical and/or physical relationship between two or more entities within the process plant, wherein each relationship value reference comprises a process control tag that uniquely identifies a first process control entity, a process control tag type that references a description of the first process control entity, a related process control tag type that references a description of a second process control entity related to the first process control entity, and a related process control tag that uniquely identifies the second process control entity;
    binding each relationship value reference to two or more process control graphical elements of the operator display based on the associated process control graphical element identifications, wherein a relationship value reference bound to two or more process control graphical elements uniquely identifies the logical and/or physical relationship between the two or more entities graphically illustrated by the two or more process control graphical elements;
    displaying a first process control graphical element in the operator display;
    reading, in response to a user selection of the first process control graphical element, a relationship value reference bound to the first process control graphical element; and
    displaying a second process control graphical element linked to the first process control graphical element by the relationship value reference binding the first and second process control graphical elements.

2. The method of claim 1, wherein binding each relationship value reference to two or more process control graphical elements of the operator display based on the associated process control graphical element identifications comprises creating a navigation link between the two or more process control graphical elements of the operator display, the program further comprising:
    driving navigation of the operation display from the first process control graphical element to the second process control graphical element using the relationship value reference.

3. The method of claim 1, wherein receiving a list of relationship value references and process control graphical element identifications associated with each relationship value reference comprises receiving relationship data defining a relationship between a plurality of process control tags, wherein each process control tag uniquely identifies a process control entity amongst the plurality of process control tags.

4. The method of claim 3, wherein each relationship value reference in the list of relationship value references comprises:
    a relationship key comprising information pertaining to the relationship of the first process control entity with the second process control entity in the process plant; and
    a relationship value comprising the related process control tag, wherein the related process control tag is a unique identification of the relationship between the first and second process control entities, wherein the related process control tag is unique among the process control tags.

5. The method of claim 4, wherein the relationship key comprises:
    the process control tag of the first process control entity;
    the process control tag type; and
    the related process control tag type.

6. The method of claim 4, wherein each relationship value reference in the list of relationship value references further comprises metadata, the metadata comprising:
    a relationship type describing the relationship between the first and second process control entities; and
    the cardinality of the relationship between the first and second process control entities.

7. The method of claim 6, wherein the relationship type comprises one of: a hierarchical relationship or a lateral relationship.

8. The method of claim 1, wherein the relationship between the first and second process control entities comprises more than one degree of separation based on the configuration of the process control entity in the process control system.

9. The method of claim 1,
    wherein the first process control graphical element in the operator display comprises a graphical sub-element associated with the relationship value reference if the process control graphical element is bound to a relationship value reference, and
    wherein reading, in response to a user selection of the first process control graphical element, a relationship value reference bound to the first process control graphical element comprises reading, in response to a user selection of the graphical sub-element, the relationship value reference associated with the graphical sub-element.

10. The method of claim 1,
wherein displaying a first process control graphical element in the operator display comprises displaying a first faceplate associated with the first process control graphical element, and
wherein displaying a second process control graphical element linked to the first process control graphical element by the relationship value reference binding the first and second process control graphical elements comprises displaying a second faceplate associated with the second process control graphical element.

11. The method of claim 1, wherein receiving a list of relationship value references and process control graphical element identifications associated with each relationship value reference comprises receiving the list of relationship value references and process control graphical element identifications without accessing process control system runtime data.

12. The method of claim 1, wherein receiving a list of relationship value references and process control graphical element identifications associated with each relationship value reference comprises:
receiving a list of relationship value references and process control graphical element identifications associated with each relationship value reference from a relationship storage database;
replicating the list of relationship value references and process control graphical element identifications associated with each relationship value reference on an operator workstation running the operator display.

13. The method of claim 1, further comprising:
configuring a relationship value reference and two or more process control graphical element identifications associated with the relationship value reference;
publishing the relationship value reference and the two or more process control graphical element identifications; and
binding each configured relationship value reference to two or more process control graphical elements of the operator display based on the two or more configured process control graphical element identifications.

14. The method of claim 1,
wherein the entity associated with the first process control graphical element comprises one of the group consisting of: a control algorithm, a function block, a function block parameter, a process control module, an equipment module, a process control module step, a process control module transition, a process control module action, a process control device, a process controller, a process control loop, a process control unit, a process control area, an alarm, a faceplate display, a detail display, a primary control display, a user-defined display, a diagnostic display, a standard operating procedure for a device, a material safety data sheet, a process control recipe, and a process control system node, and
wherein the entity associated with the second process control graphical element comprises one of the group consisting of: a control algorithm, a function block, a function block parameter, a process control module, an equipment module, a process control module step, a process control module transition, a process control module action, a process control device, a process controller, a process control loop, a process control unit, a process control area, an alarm, a faceplate display, a detail display, a primary control display, a user-defined display, a diagnostic display, a standard operating procedure for a device, a material safety data sheet, a process control recipe, and a process control system node.

\* \* \* \* \*